US012333026B2

(12) United States Patent
Ortiz et al.

(10) Patent No.: US 12,333,026 B2
(45) Date of Patent: *Jun. 17, 2025

(54) SYSTEM AND METHOD FOR SECURE ELECTRONIC TRANSACTION PLATFORM

(71) Applicant: ROYAL BANK OF CANADA, Toronto (CA)

(72) Inventors: Edison U. Ortiz, Orlando, FL (US); Arya Pourtabatabaie, Orlando, FL (US); Ambica Pawan Khandavilli, Orlando, FL (US); Margaret Inez Salter, Orlando, FL (US); Jordan Alexander Richards, Orlando, FL (US); Iustina-Miruna Vintila, Bucharest (RO)

(73) Assignee: ROYAL BANK OF CANADA, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/403,885

(22) Filed: Jan. 4, 2024

(65) Prior Publication Data

US 2024/0184898 A1 Jun. 6, 2024

Related U.S. Application Data

(63) Continuation-in-part of application No. 17/169,221, filed on Feb. 5, 2021, now Pat. No. 11,868,486.

(51) Int. Cl.
*H04L 29/06* (2006.01)
*G06F 12/14* (2006.01)
(Continued)

(52) U.S. Cl.
CPC ........ *G06F 21/602* (2013.01); *G06F 12/1408* (2013.01); *G06N 20/00* (2019.01);
(Continued)

(58) Field of Classification Search
None
See application file for complete search history.

(56) References Cited

U.S. PATENT DOCUMENTS

| 7,401,361 B2 | 7/2008 | Freeman | G06F 21/564 |
| | | | 726/22 |
| 7,434,068 B2 | 10/2008 | Nguyen | G06F 21/575 |
| | | | 713/189 |

(Continued)

FOREIGN PATENT DOCUMENTS

| CN | 1234892 A | 11/1999 |
| CN | 1700138 A | 11/2005 |

(Continued)

OTHER PUBLICATIONS

United States Patent & Trademark Office (USPTO), Non Final Rejection issued to U.S. Appl. No. 17/169,221, filed Jan. 27, 2022.

(Continued)

*Primary Examiner* — Maung T Lwin
(74) *Attorney, Agent, or Firm* — Norton Rose Fulbright Canada LLP

(57) ABSTRACT

A system for processing data within a Trusted Execution Environment (TEE) of a processor is provided. The system may include: a trust manager unit for verifying identity of a partner and issuing a communication key to the partner upon said verification of identity; at least one interface for receiving encrypted data from the partner encrypted using the communication key; a secure database within the TEE for storing the encrypted data with a storage key and for preventing unauthorized access of the encrypted data within the TEE; and a recommendation engine for decrypting and analyzing the encrypted data to generate recommendations based on the decrypted data.

20 Claims, 26 Drawing Sheets

(51) Int. Cl.
*G06F 21/60* (2013.01)
*G06N 20/00* (2019.01)
*H04L 9/08* (2006.01)
*H04L 9/32* (2006.01)

(52) U.S. Cl.
CPC ............ *H04L 9/0844* (2013.01); *H04L 9/321* (2013.01); *H04L 9/3247* (2013.01); *G06F 2212/1052* (2013.01)

(56) References Cited

U.S. PATENT DOCUMENTS

| | | | | |
|---|---|---|---|---|
| 7,463,739 | B2 | 12/2008 | Couillard | H04L 9/0836 |
| | | | | 713/192 |
| 8,190,917 | B2* | 5/2012 | Nutter | G06F 9/485 |
| | | | | 713/193 |
| 8,213,618 | B2* | 7/2012 | Dewan | G06F 21/57 |
| | | | | 713/189 |
| 8,219,811 | B2 | 7/2012 | Roundtree | G06F 21/57 |
| | | | | 713/184 |
| 8,316,237 | B1 | 11/2012 | Felsher | H04L 9/0825 |
| | | | | 713/171 |
| 8,386,798 | B2* | 2/2013 | Dodgson | H04L 63/0428 |
| | | | | 713/193 |
| 8,572,410 | B1* | 10/2013 | Tkacik | H04L 9/0861 |
| | | | | 713/192 |
| 8,738,932 | B2* | 5/2014 | Lee | G06F 21/72 |
| | | | | 726/16 |
| 8,959,615 | B2 | 2/2015 | Nagai | G06F 21/10 |
| | | | | 713/168 |
| 9,258,331 | B2 | 2/2016 | Dyer | G06F 21/57 |
| 10,956,585 | B2 | 3/2021 | Ortiz | G06N 20/00 |
| 11,520,913 | B2 | 12/2022 | Boivie | G06N 20/00 |
| 2003/0005322 | A1 | 1/2003 | Kiiveri | G06F 21/82 |
| | | | | 713/193 |
| 2007/0101434 | A1 | 5/2007 | Jevans | G06F 21/32 |
| | | | | 726/26 |
| 2008/0046760 | A1 | 2/2008 | Nakazato | G11B 20/00507 |
| | | | | 713/193 |
| 2008/0263371 | A1 | 10/2008 | Weissman | G06F 21/74 |
| | | | | 713/193 |
| 2009/0151006 | A1 | 6/2009 | Saeki | G06F 21/10 |
| | | | | 726/28 |
| 2009/0187772 | A1* | 7/2009 | Lange | H04N 7/165 |
| | | | | 713/193 |
| 2010/0031370 | A1 | 2/2010 | Ellison | G06F 21/575 |
| | | | | 726/27 |
| 2010/0250935 | A1 | 9/2010 | Ginter et al. | |
| 2011/0082979 | A1* | 4/2011 | Ramesh | G06F 21/78 |
| | | | | 713/193 |
| 2012/0159195 | A1 | 6/2012 | von Behren | G06F 21/62 |
| | | | | 713/193 |
| 2012/0221866 | A1 | 8/2012 | Flynn | G06F 12/1408 |
| | | | | 713/193 |
| 2013/0151848 | A1 | 6/2013 | Baumann et al. | |
| 2013/0173916 | A1* | 7/2013 | Sato | G06F 21/6218 |
| | | | | 713/165 |
| 2013/0219507 | A1* | 8/2013 | Chang | G06F 21/71 |
| | | | | 726/26 |
| 2013/0276149 | A1 | 10/2013 | Gremaud | G06F 21/64 |
| | | | | 726/30 |
| 2013/0311789 | A1 | 11/2013 | Johnson | G06F 12/1408 |
| | | | | 713/193 |
| 2014/0032934 | A1 | 1/2014 | Nagai | G06F 21/10 |
| | | | | 713/193 |
| 2014/0108805 | A1 | 4/2014 | Smith | H04L 9/3247 |
| | | | | 713/176 |
| 2014/0157423 | A1 | 6/2014 | Edelsten | G06F 21/121 |
| | | | | 726/26 |
| 2015/0163206 | A1 | 6/2015 | McCarthy | G06F 21/10 |
| | | | | 713/171 |
| 2015/0220456 | A1 | 8/2015 | Fel | G06F 12/0802 |
| | | | | 713/193 |
| 2015/0220737 | A1 | 8/2015 | Rothman | G06F 21/604 |
| | | | | 726/1 |
| 2016/0182465 | A1 | 6/2016 | Lam | G06F 21/6218 |
| | | | | 713/171 |
| 2016/0204945 | A1* | 7/2016 | Lange | H04N 21/4623 |
| | | | | 713/176 |
| 2017/0033930 | A1 | 2/2017 | Costa et al. | |
| 2017/0093806 | A1 | 3/2017 | Phegade et al. | |
| 2017/0243028 | A1 | 8/2017 | Lafever et al. | |
| 2017/0257365 | A1 | 9/2017 | Gonzalez | H04L 63/1416 |
| 2017/0270509 | A1 | 9/2017 | Colegate et al. | |
| 2017/0372226 | A1 | 12/2017 | Costa et al. | |
| 2018/0359228 | A1 | 12/2018 | Lerner | H04L 9/0825 |
| 2019/0036208 | A1 | 11/2019 | Ortiz et al. | |
| 2021/0203491 | A1 | 7/2021 | Wei | H04L 9/3255 |

FOREIGN PATENT DOCUMENTS

| | | |
|---|---|---|
| CN | 102687133 A | 9/2012 |
| CN | 105745678 A | 7/2016 |
| CN | 106255984 A | 12/2016 |
| CN | 106416121 A | 2/2017 |
| CN | 107332671 A | 11/2017 |
| WO | 2015089171 A1 | 6/2015 |

OTHER PUBLICATIONS

China National Intellectual Property Administration (CNIPA), First Office Action issued to CN 2019800341609, Dec. 22, 2023.
Israeli Patent Office, Office Action issued to IL 277974, Mar. 20, 2023.
IP Australia, Examination report No. 1 issued to Application No. 2019277292, Aug. 10, 2023.
Japanese Patent Office (JPO), Notification of Reasons for Refusal to JP 2020-566967, May 23, 2023.
Intellectual Property India, First Examination Report to Application No. 202027052946, Jul. 7, 2022.
European Patent Office (EPO), Extended European Search Report to EP Application No. 19812339.0, Jan. 26, 2022.
International Search Report and Written Opinion issued in International Application No. PCT/CA2019/050725, dated Sep. 5, 2019.
Form PTO/SB/08a filed in U.S. Appl. No. 17/169,221, filed Nov. 10, 2023 approved by Examiner (4 pages).
Form PTO/SB/08a filed in U.S. Appl. No. 17/169,221, filed Aug. 23, 2023 approved by Examiner (4 pages).
Form PTO-892 related to U.S. Appl. No. 17/169,221, which was part of paper dated Aug. 11, 2023 (1 page).
Form PTO-892 related to U.S. Appl. No. 17/169,221, which was part of paper dated Jan. 11, 2023 (1 page).
Form PTO/SB/08a filed in U.S. Appl. No. 17/169,221, filed Jul. 8, 2022 approved by Examiner (4 pages).
Form PTO-892 related to U.S. Appl. No. 17/169,221, which was part of paper dated Jun. 22, 2022 (1 page).
Form PTO/SB/08a filed in U.S. Appl. No. 17/169,221, filed Apr. 25, 2022 approved by Examiner (4 pages).
Form PTO-892 related to U.S. Appl. No. 17/169,221, which was part of paper dated Jan. 23, 2022 (1 page).
Form PTO-892 related to U.S. Appl. No. 16/424,242, which was part of paper dated Oct. 30, 2020 (1 page).
Form PTO/SB/08a filed in U.S. Appl. No. 17/169,221, filed Nov. 26, 2019, and submitted as well in U.S. Appl. No. 17/169,221, filed Apr. 23, 2021 (3 pages).
Korean Intellectual Property Office (KIPO), Notice of Preliminary Rejection issued to KR 10-2020-7036669, Apr. 16, 2024.
European Patent Office (EPO), Communication from Examining Division issued to EP 19.812.339.0, Mar. 16, 2023.
John M. et al: "Intel Software Guard Extensions Tutorial Series: Part 1, Intel SGX Foundation", Internet Citation, Jul. 7, 2016 (Jul. 7, 2016), XP002779031, Retrieved from the Internet: URL:https://software.intel.com/en-us/articles/intel-software-guardextensions-tutorial-part-1-foundation [retrieved on Mar. 12, 2018].

* cited by examiner

SYSTEM AND METHOD FOR SECURE ELECTRONIC TRANSACTION PLATFORM

CROSS-REFERENCE

This application is a Continuation of U.S. application Ser. No. 17/169,221, filed on Feb. 5, 2021, which is a Continuation of U.S. application Ser. No. 16/424,242 (now U.S. Pat. No. 10,956,585) filed on May 28, 2019, which is a non-provisional of, and claims all benefit, including priority to U.S. Provisional Application No. 62/677,133 filed May 28, 2018; U.S. Provisional Application No. 62/691,406 filed Jun. 28, 2018; U.S. Provisional Application No. 62/697,140 filed Jul. 12, 2018; U.S. Provisional Application No. 62/806,394 filed Feb. 15, 2019; and U.S. Provisional Application No. 62/824,697 filed Mar. 27, 2019; all of which are entitled SYSTEM AND METHOD FOR SECURE ELECTRONIC TRANSACTION PLATFORM.

The contents of the above applications are hereby incorporated by reference in their entireties.

FIELD

This disclosure generally relates to the field of electronic data processing, and in particular to secure processing of electronic transaction data.

BACKGROUND

Consumers place a level of trust in financial institutions and vendors when they make a purchase using a financial product (e.g., a credit card or a loyalty membership card), such that their private information, such as the transaction data, would not be exposed to other parties without explicit consent from the consumers. At the same time, consumers respond better to personalized offers than to unpersonalized recommendations.

Banks and merchants are generally unwilling to share consumer data with other organizations, as protection of consumer privacy is of utmost importance to them. In addition, even with explicit consent from the consumers, the banks and merchants are still reluctant to share consumer data with other parties, as they may lose control or ownership of the shared data.

There is a desire to ensure protection of privacy during data processing and transformation. However, the increased privacy leads to technical challenges as additional steps of encryption and decryption may lead to increased infrastructure demands, as well as technical limitations on performance.

SUMMARY

Embodiments described herein are directed to technical solutions adapted to overcome technical challenges associated with improved privacy and security. A data aggregator computer system is described that is configured to receive, from a number of separate computing systems, one or more data sets.

Specific features are described in some embodiments to overcome challenges in respect of computing resource constraints, especially in environments that operate under increased levels of encryption, as the additional encryption causes increased computational burdens.

Furthermore, as in some embodiments, a separate secure memory region is utilized, such region is memory space constrained as it may be physically or electronically isolated from other computing subsystems, such as kernel processes or operating systems (e.g., even an administrator having root access on the server device may not have access to the underlying data stored in the protected memory region). Accordingly, the chances of and exposure to a malicious attack or data breach is significantly reduced as the secure enclave provides a very high security environment for conducting data processing or machine learning.

These data sets can represent sensitive information of the organizations of the separate computing systems, which the organizations do not wish to be accessible to other computing systems, or even administrators of the data aggregator computer system. Systems, methods, and computer readable media are described that utilize secure processing technologies, such as secure enclaves, in relation to the operation of an improved processing architecture that has enhanced privacy and security measures. In some embodiments, the machine learning data model architectures and their components are also stored in the secure memory region so that they cannot be interacted with or accessed As described above, these enhanced privacy and security measures lead to increased technical challenges as, for example, encryption and decryption requirements reduce total computing resources available in various situations. Computing resources may be constrained due to requirements that particular aspects need to be conducted using only secure processors and data elements may require to be stored only in encrypted formats while outside of secure processing environments. Secure processing is directed to protect the overall computational steps such that parties without having proper access privileges are unable to access one or more portions of the underlying data that is being used in the machine learning data architectures.

The received data sets are stored in a protected memory region that is encrypted such that it is inaccessible to an operating system and kernel system. The protected memory region includes at least a data storage region and a data processing subsystem storage region maintaining an isolated data processing subsystem that processes the data to generate output data structures. In an example embodiment, the data processing subsystem applies a processing function that utilizes components of a query request and/or elements of the stored data sets in generating an output.

As a simplified example, the data sets can be used for benchmarking and in response to query request about a benchmark statistic, the aggregated data sets can be queried to obtain a response (e.g., utilizing data sets not only from data source A, but also data source B, C, D while maintaining the privacy and security of the underlying data sets as no parties are able to access the protected memory region). The protected memory data region can be protected, for example, by being encrypted with a key mechanism that is only known to a secure enclave data processor and not accessible to any other parties, even including administrators of a system upon which the secure enclave data processor resides, or through the operating system or kernel processes of the system upon which the secure enclave data processor resides.

In some further embodiments, a specialized cache memory is provided where the protected memory region is loadable, and where data sets can be loaded and then encrypted subsequent to recordal, and where data sets are no longer accessible after loading into the protected memory region.

In a second aspect, the processing, for example, is conducted through a securely stored machine learning data model architecture that is persisted and trained iteratively through the data sets stored thereon. In this embodiment, the underlying components of the machine learning data model architecture (e.g., hidden layers, computing nodes, interconnections, data structures representing the nodes) are also not accessible through the operating system or kernel processes of the system upon which the secure enclave data processor resides as the underlying components of the machine learning data model architecture are also maintained or stored in the protected memory region. The interconnected computing nodes operate in concert to generate the output data structure responsive to the query data message, through a dynamically modified activation function that is trained over a number of training epochs (e.g., by learning through gradient descent in view of optimizing a loss function).

In an embodiment, secure enclaves (e.g., isolated data processors, either hardware or software, or combinations thereof) are utilized for conducting machine learning subtasks. The secure enclaves, in some embodiments, may store encryption keys that are used for securely accessing underlying data.

Secure enclave processing leads to limitations in respect of computing resource constraints, which may lead to reduced performance and speed. Relative to non-secure processing paradigms, increased complexity results due to encryption and access restriction requirements.

Accordingly, as described in various embodiments herein, an approach is proposed that is directed to machine learning data architectures with strong privacy and robust security. The machine learning architecture, in some embodiments, includes multiple interconnected secure enclave processing partitions (e.g., separate secure enclave processors), which process and maintain separate training model architecture.

As the data is processed through each of the partitions, a separate model architecture is updated to generate updated model architecture parameter data structures. The updated model architecture parameter data structures from each of the partitions is aggregated at a parameter aggregation unit (e.g., parameter server, which can be its own enclave). The parameter aggregation unit is configured to save an update an aggregated trained model architecture which is then re-propagated to the secure processing traditions. This architecture of some embodiments aids in overcoming technical constraints related to reduced throughput of secure enclave partitions. For example, some secure enclave partitions are limited to model architecture sizes of approximately 90 MB or smaller. Accordingly a number of coordinated partitions operate in concert to provide the overall secure processing.

Applications for machine learning and secure she learning as described in some embodiments include, for example, generation of data structures by the machine learning model architectures that include subsets of customer identifiers for identifying clusters based on similarities with a training set of identifiers. For example, a training set of identifiers can include high revenue loyal customers, and the trained model architecture, can be utilized to identify target customers that are not within the training set but may be overlooked as potential targets. In this example, secure processing using a secured machine learning data architecture is used to ensure that there is no unauthorized access of the underlying data, which could include sensitive customer data, is made by unauthorized users. The secure enclave processors are used to ensure, for example, that merchants would not have a full view of customer profiles, especially where such merchants are not the custodians of the customer profiles.

In another embodiment, the enclave partitions are also configured to have interconnections with one another during parallel operations such that the enclave partitions are able to share determine parameters amongst each other as opposed to receiving updated parameters in trained models from the aggregator processor.

In accordance with one aspect, there is provided a system for processing data within a Trusted Execution Environment (TEE) of a processor. The system may include: a trust manager unit for verifying identity of a partner and issuing a communication key to the partner upon said verification of identity; at least one interface for receiving encrypted data from the partner encrypted using the communication key; a secure database within the TEE for storing the encrypted data with a storage key and for preventing unauthorized access of the encrypted data within the TEE; and a recommendation engine for decrypting and analyzing the encrypted data to generate recommendations based on the decrypted data.

In accordance with another aspect, there is provided a computer-implemented method for processing data within a Trusted Execution Environment (TEE) of a processor. The method may include: verifying identity of a partner; issuing a communication key to the partner upon said verification of identity; receiving encrypted data from the partner encrypted using the communication key; storing the encrypted data with a storage key to prevent unauthorized access of the encrypted data within the TEE; and decrypting and analyzing the encrypted data to generate recommendations based on the decrypted data.

In accordance with another aspect, the computer readable memory having the protected memory region is stored on DRAM.

In accordance with another aspect, the key required to decrypt the protected memory region into the computer readable cache memory is stored within the secure enclave data processor and not accessible outside the secure enclave data processor.

In accordance with another aspect, the key required to decrypt the protected memory region into the computer readable cache memory is originally generated with a nonce term, and the nonce term is stored within the secure enclave data processor and not accessible outside the secure enclave data processor.

In accordance with another aspect, a remote attestation process is periodically conducted by a secure enclave data processor to validate security of the system, the remote attestation process includes transmitting a remote attestation payload to the secure enclave data processor that includes a Diffie Hellman message.

In accordance with another aspect, a remote attestation process is periodically conducted by a secure enclave data processor to validate security of the system, the remote attestation process includes the secure enclave data processor generating a remote attestation transcript data structure and transmitting the remote attestation transcript data structure along with a signed challenge payload and a new Diffie Hellman message payload.

In accordance with another aspect, the secure enclave data processor is configured to provide: a partition controller engine configured to provision one or more secure enclave sub processors and to transmit to each of the one or more secure enclave sub processors a partition of the protected memory region; the one or more secure enclave sub processors configured to process the corresponding partition of the protected memory region using a local copy of the machine learning data model architecture to generate one or more parameter update data structures; a partition aggregation engine configured to receive, from each of the one or more secure enclave sub processors, the one or more parameter update data structures, and to process the one or more parameter update data structures to refine at least one parameter of the machine learning data model architecture, the machine learning data model architecture distributed to the one or more secure enclave sub processors to update the corresponding local copy of the machine learning data model architecture.

DESCRIPTION OF THE FIGURES

Embodiments will now be described, by way of example only, with reference to the attached figures, wherein in the figures:

FIG. 22 is an example rendering of a graphical user interface adapted to show a graphical widget showing a generated recommendation, according to some embodiments.

FIG. 23 is an example rendering of a graphical user interface adapted to show a graphical widget bar showing generated recommendations, according to some embodiments.

DETAILED DESCRIPTION

Figure 1:
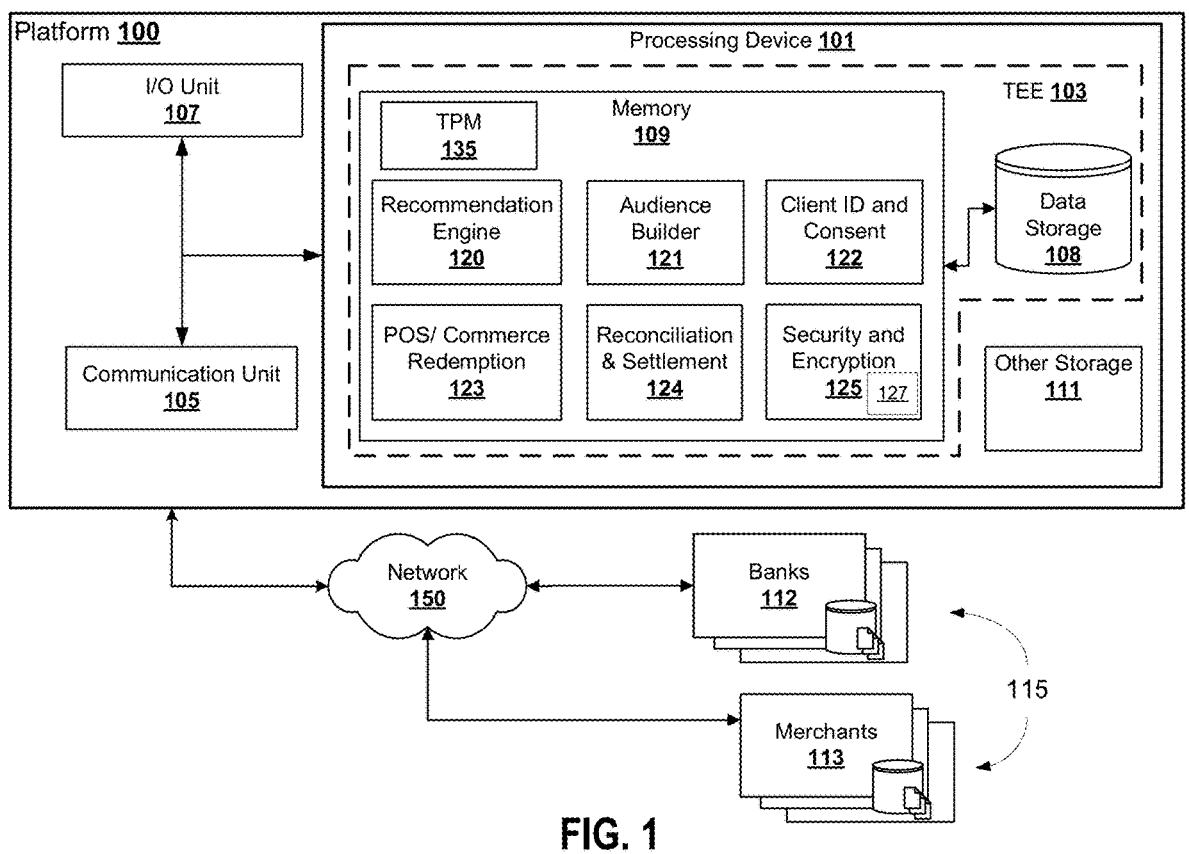
FIG. 1 is a block diagram illustrating an example platform for processing secure consumer data according to some embodiments.

It will be appreciated that numerous specific details are set forth in order to provide a thorough understanding of the exemplary embodiments described herein. However, it will be understood by those of ordinary skill in the art that the embodiments described herein may be practiced without these specific details. Furthermore, this description is not to be considered as limiting the scope of the embodiments described herein in any way, but rather as merely describing implementation of the various example embodiments described herein.

The embodiments are implemented using technological devices, including computers, having specialized components and circuitry that are adapted for improved security and privacy of data sets. As noted herein, the embodiments are directed to a secure enclave data processor and uses thereof in conjunction with a computer readable memory having a protected memory region.

The secure enclave data processor interfaces with the protected memory region to securely store and encrypt data sets received from a particular data source (e.g., from a partner organization) that may, in some embodiments, be encrypted with a key specific to the partner organization or data source. In an embodiment, the key may be pre-generated and associated with the partner organization or data source. In another embodiment, the system may include a key generator which performs a key generation ceremony when a new key is required to load data sets into the protected memory region.

As noted herein, data sets are loaded specific to a particular computing device or data source. In some embodiments, the load is one-way such that the keys are destroyed or the encryption keys are not provided back to the particular computing device or data source. In a variant embodiment, a one-way load can use the data loaded for training or otherwise incorporation into a data processing or machine learning data model architecture, upon which after the data is deleted (e.g., data is used only for training).

In other embodiments, the load can be two-way whereby a particular computing device or data source is able to extract its own data sets or modify data in data sets previously provided. In an alternate embodiment, the output data structures can be modifications to the data in the data sets (e.g., extending the data sets with metadata) and the extraction of the data sets can be used to generate an extended or otherwise improved version of the data (e.g., customer data is provisioned, and augmented customer data showing estimated customer-type classification strings are extracted). The machine learning data model architecture, in some embodiments, can also be loaded or unloaded such that an untrained machine learning data model architecture can be loaded in and a trained machine learning data model architecture can be extracted out, without providing access to any party to the underlying data sets.

Consumers place a certain level of trust in financial institutions and vendors when they make a purchase using a financial product (e.g. a credit card or a loyalty membership card), such that their private information, such as the transaction data, would not be exposed to other parties without explicit consent from the consumers. At the same time, consumers respond better to personalized offers than to general recommendations. Banks and merchants are generally unwilling to share consumer data with other organizations, as protection of consumer privacy is of utmost importance to them.

In addition, even with explicit consent from the consumers, the banks and merchants are still reluctant to share consumer data with other parties, as they may lose control or ownership of the shared data. The data sets received from a particular data source are, stored into the protected memory region such that other parties are unable to access the data sets, but the data sets are accessible within the protected memory region by a data processing subsystem for generation of computer generated insights and/or values that are encapsulated in the form of output data structures. In some embodiments, the output data structures can include trained machine learning data model architectures as well.

The output data structures can be generated responsive to query data messages, which, in some aspects, can include new information for the system to process, or can be query requests directed to aggregated existing information stored thereon in the protected memory region.

For example, a query data message can provide a vector directed to a hypothetical customer profile, and the trained machine learning data model architecture can output a data structure storing a field indicating whether the trained machine learning data model architecture predicts that the hypothetical customer profile would be amenable to a proposed offer.

In another example, the query data message may not include any additional information but rather a query based on the aggregated in the information stored in the protected memory region or based on the trained machine learning data model architecture. For example, a query data message may be directed to: "what is the average length of time a customer spends in retail stores in the Washington DC region relative to the average length of time in the United States generally?", or where there is a trained machine learning data model architecture, "how many clusters of customers are identified based on the total aggregated transaction behavior of customers in the Washington DC region?" (e.g., if an unsupervised model is used to identify a number of clusters).

A secure platform for processing private consumer data, such as transaction data, is described herein. In some embodiments, the platform may interface with participating partners (e.g., banks and merchants) to receive, from a respective system of each partner, consumer data including transaction data (also referred to as "TXN data"). The consumer data may be encrypted with an encryption key.

The platform may store the received consumer data in a secure area (also referred to as the "Clean Room"), where the consumer data is then decrypted and analyzed to generate personalized offers for each consumer. The received consumer data from the partners cannot be accessed, decrypted or read by any other user, system or process except by the Clean Room for the stipulated purpose, i.e., for the purpose of running the analytics and generating the offers. This platform enables the execution of analytics on encrypted data, elevates the concerns of banks and merchants with respect to losing or diluting the control and ownership of the consumer data, and serves to protect the privacy of consumer data. In some embodiments, the owner of the computer hosting the platform may be unable to view or infer anything about input or output data.

In some embodiments, the Clean Room is implemented within one or more secure enclaves within a Trusted Execution Environment (TEE) of a processor (e.g., a CPU), where data models may be trained and executed to conduct any level of analytics. Key management capabilities are also in place to ensure proper encryption and decryption of the data stored within the Clean Room.

Embodiments described herein are directed to technical solutions adapted to overcome technical challenges associated with improved privacy and security. In particular, systems, methods, and computer readable media are described that utilize secure processing technologies, such as secure enclaves, in relation to the operation of an improved machine learning data architecture that has enhanced privacy and security measures.

As described above, these enhanced privacy and security measures lead to increased technical challenges as, for example, encryption and decryption requirements reduce total computing resources available in various situations. Computing resources may be constrained due to requirements that particular aspects need to be conducted using only secure processors and data elements may require to be stored only in encrypted formats while outside of secure processing environments.

FIG. 1 is a block diagram illustrating an example electronic transaction platform 100 for receiving and processing secure consumer data, over a network 150, according to some embodiments. The consumer data may be received from partner system(s) 115, which may include bank system(s) 112 and merchant system(s) 113. FIGS. 2 and 3 provide schematic diagrams of an example Clean Room 300 implemented on platform 100.

A processing device 101 can execute instructions in memory 109 to configure various components or units 120, 121, 122, 123, 124, 125. A processing device 101 can be, for example, a microprocessor or microcontroller, a digital signal processing (DSP) processor, an integrated circuit, a field programmable gate array (FPGA), a reconfigurable processor, or any combination thereof. Processing device 101 may include memory 109, data storage 108, and other storage 111. In some embodiments, processing device 101 includes a secure area known as a trusted execution environment (TEE) 103. TEE 103 may include memory 109 and data storage 108, and is an isolated environment in which various units and applications may be executed and data may be processed and stored. Applications running within TEE 103 may leverage the full power of processing device 101 while being protected from components and applications in a main operating system. Applications and data within TEE 103 are protected against unwanted access and tampering, even against the owner of processing device 101. In some cases, different applications and data storage within TEE 103 may be separately isolated and protected from each other, if needed.

In some embodiments, the protected memory region of the TEE 103 (e.g., secure data warehouse 108) is isolated through the use of encryption. In this example, the encryption keys are stored within the TEE 103 itself so that it can access data as required but the underlying data is not accessible by other components, such as an operating system operating on the server or a kernel process. In an alternate embodiment, the isolation is conducted through the use of physical or electrical circuit isolation from the other components. In yet another alternate embodiment, both physical and encryption isolation are utilized.

As components and data of platform 100 are kept within TEE 103, they are well guarded against unauthorized access and tampering due to the isolation and security afforded by TEE 103. Therefore partner systems 115 have confidence that their consumer data would not be inadvertently leaked or accessed by others. As will be described below, each partner may verify that platform 100 within TEE 103 is secure and tamper-free prior to transmitting any data to platform 100 (e.g., through attestation processes). Therefore, partner systems 115 have a high level of trust in platform 100 and would be more willing to send their consumer data to platform 100 for processing and in turn, receiving targeted recommendations and offers to current and prospective customers.

Data storage 108 can be, for example, one or more NAND flash memory modules of suitable capacity, or may be one or more persistent computer storage devices, such as a hard disk drive, a solid state drive, and the like. In some embodiments, data storage 108 comprises a secure data warehouse configured to host encrypted data.

Memory 109 may include a combination of computer memory such as, for example, static random-access memory (SRAM), random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like.

In some embodiments, data within the TEE can be stored in a data storage 108, memory 109, or some combination thereof.

Data storage 108 may comprise a secure data warehouse configured to store information associated with the TEE 103, such as cryptographic keys for remote attestation, encryption and decryption. Data storage 108 may also store confidential information such as consumer data including transaction data. Storage 108 and/or other storage 111 may be provided using various types of storage technologies, and may be stored in various formats, such as relational databases, non-relational databases, flat files, spreadsheets, extended markup files, etc. Data storage 108 can include, for example, a computer readable cache memory for loading the protected memory region, among others, as well as the protected memory region itself. Where the data storage 108 is configured for two-way access, the data storage 108 may store corresponding public keys corresponding to specific data sources for encrypting the data prior to access requested by computing devices associated with the specific data sources.

The data storage 108, in some embodiments, maintains an isolated machine learning data model architecture that is trained based on data sets received by the TEE 103, which may or may not be stored after processing on data storage 108. For example, if data is not stored on data storage 108 after processing and training, performance can be improved as less overall storage is required. This is useful where the data sets are particularly large or voluminous. In another embodiment, data sets are stored on data storage 108 in the protected memory region for future usage or time-spanning analysis.

The data storage 108, can also store output data structures, which can be interacted with through recommendation engine 120, the output data structures storing field values that are generated by processing by a data processing subsystem. In some embodiments, the data processing subsystem of the TEE 103 includes a stored function that is generated based on an aggregate of the data sets received from the corresponding partner computing devices.

Each I/O unit 107 enables the platform 100 to interconnect with one or more input devices, such as a keyboard, mouse, camera, touch screen and a microphone, or with one or more output devices such as a display screen and a speaker. The I/O unit 107 can be used to receive instructions to prepare for loading/unloading data into data storage 108, and may require the provisioning of a specific access key required to access or otherwise decrypt or validate data for loading into data storage 108.

The I/O unit 107 can also receive as a data structure, an instruction set, or a query string, the query data message that triggers the data processing subsystem to generate various output data structures.

Each communication interface 105 enables the platform 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The platform 100 may be operable to register and authenticate users (using a login, unique identifier, and password for example) prior to providing access to applications, a local network, network resources, other networks and network security devices. The platform 100 may serve one user or multiple users. In some embodiments, users' credential information are stored within TEE 103, making them secure and ensuring a high level of trust from partners.

Figure 2A:
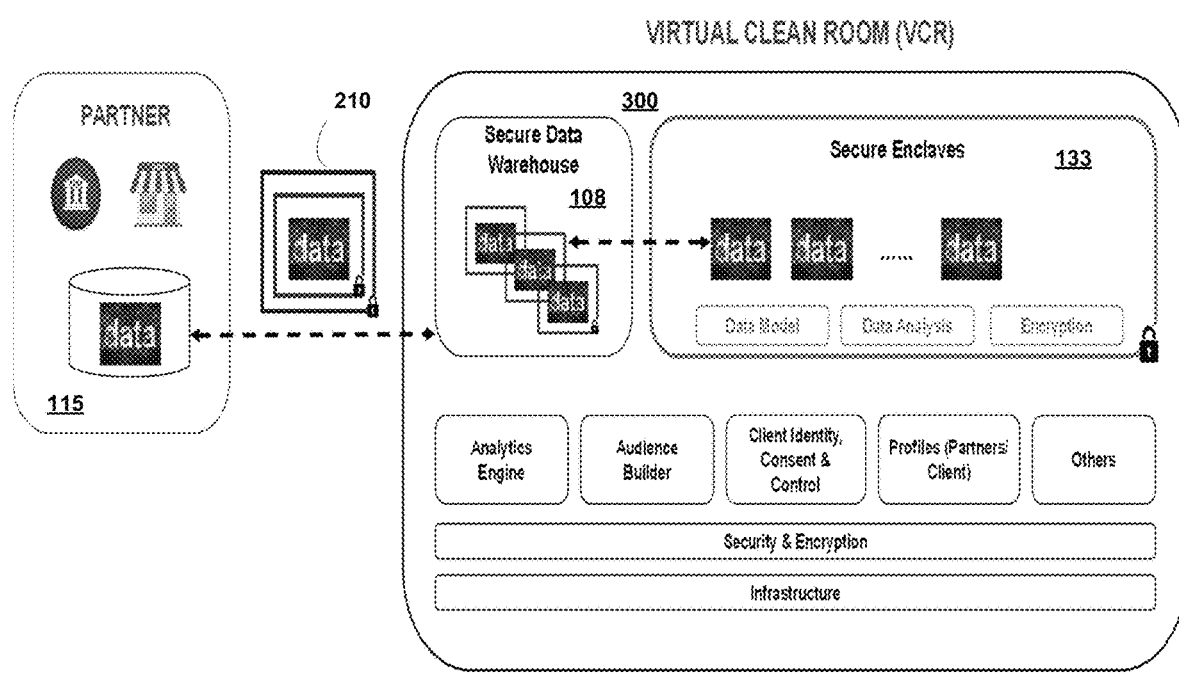
FIG. 2A is a schematic diagram of an example (Virtual) Clean Room on the platform for processing secure transaction data according to some embodiments.
Figure 3:
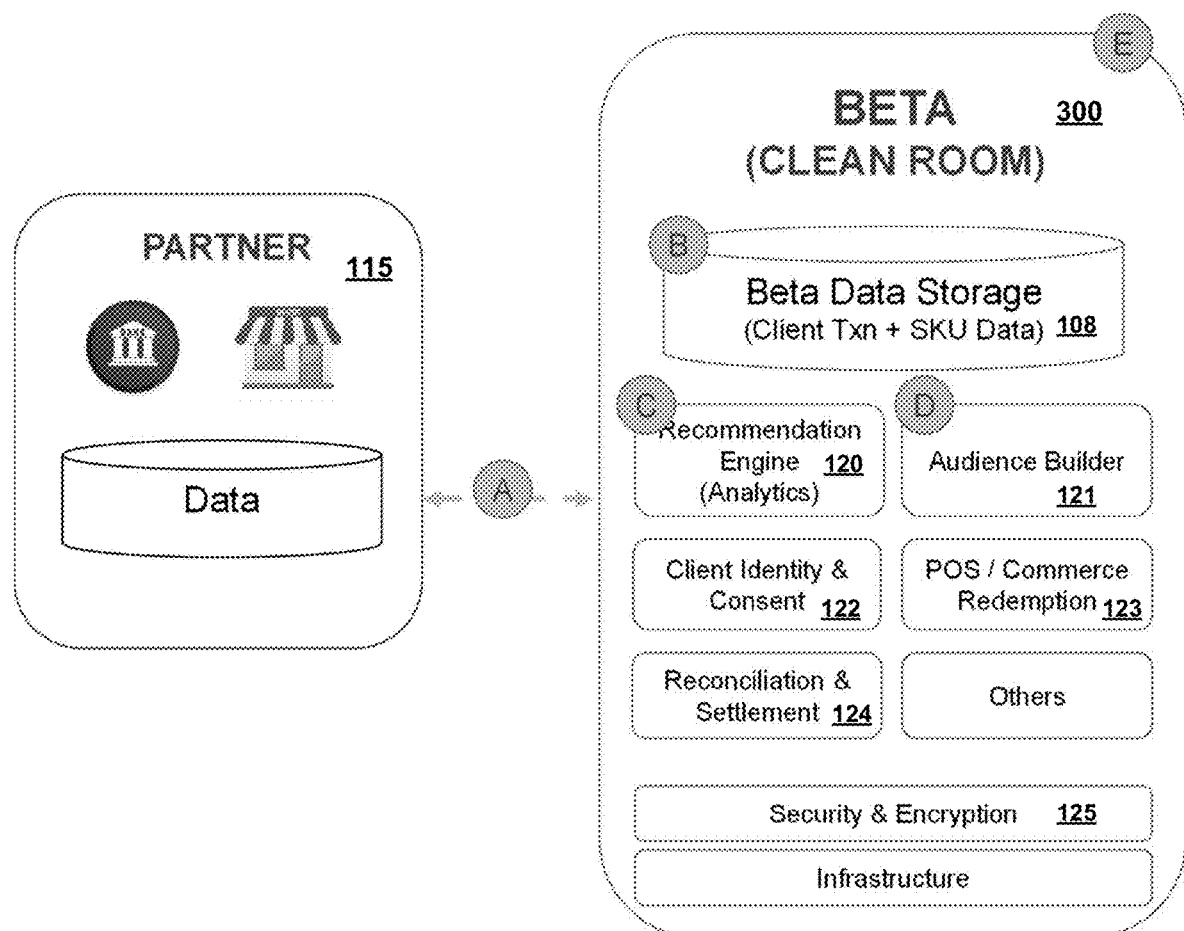
FIG. 3 is another schematic diagram of the Clean Room on the platform according to some embodiments.

FIG. 2A shows an example Virtual Clean Room 300 on platform 100 for processing secure transaction data. The Virtual Clean Room 300 may be referred to as VCR or simply Clean Room 300. A partner system 115 may encrypt user data (e.g. consumer transaction data) with keys generated by Clean Room 300, and then transmit the encrypted data across a secure channel to a secure data warehouse 108 within Clean Room 300. The user data can only be decrypted and processed in Secure Enclaves 133. Data output generated by processes within Secure Enclaves 133 are then encrypted and stored within the secure data warehouse 108.

A secure enclave 133 may be configured to store an encrypted dataset in a single secure enclave and execute one or more analytics algorithms. The secure enclave 133 may also implement cluster management to orchestrate multiple secure enclave and CPUs. As noted herein, in some embodiments, partitions are utilized to track model data architecture updates from one or more secure enclave sub processors which utilize local versions of the machine learning data model architecture and pass parameter updates to update a global version of the machine learning data model architecture periodically, effectively allowing parallelization of the training process of the machine learning data model architecture, which improves a convergence speed if a convergence is possible.

For example, a secure enclave 133 can provide secure storage of sensitive data from partner systems 133, and is the only component on platform 100 capable of decrypting the encrypted data with an appropriate and secure key management system. A secure enclave 133 can also be implemented to execute analytics on the decrypted data and provide output. The output may be encrypted prior to being transmitted outside of the secure enclave 133.

In some embodiments, one or more sets of data may form a data set in a partner system 115. The data set may be encrypted by a partner system 115 using a key generated by a secure enclave 133, then transmitted to Clean Room 300 and subsequently stored in a secure data warehouse 108. Analytics may be executed on the encrypted data by worker applications. The worker application may decrypt the data using an appropriate decryption key prior to executing said analytics. Once analytics are done, output data may be generated. In some cases, output data may be encrypted. Clean Room 300 may be the only entity in the platform 100 that can (i) store the encrypted data and (ii) decrypt for the purpose of analytics, such that no person, system or process outside of Clean Room 300 can access the secure enclaves 133.

Secure enclaves 133 protect data from administrators, since the Operating System/Kernel system can't access the decrypted enclave content by using hardware level security.

Figure 10:
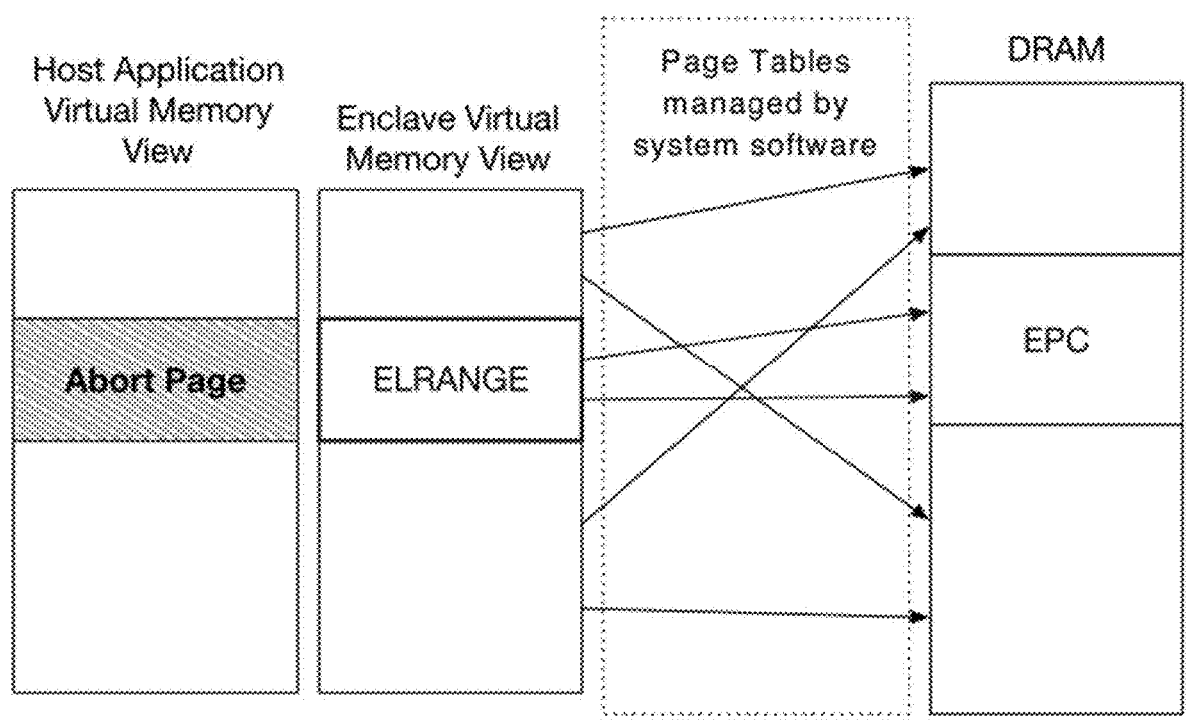
FIG. 10 shows an example memory structure for secure enclaves according to some embodiments.

FIG. 10 shows an example memory structure for secure enclaves 133 according to some embodiments. Only secure enclaves can load the protected memory region from DRAM (all other applications get a cache error from the cache manager).

Enclave data on DRAM is encrypted and is only decrypted when loaded into cache using special instructions, so the enclave data are protected from administrators, OS/kernel system/processes and outside entities. Access to the decryption keys are restricted and, in some embodiments, are only available within the secure enclaves 133 without accessibility by a human analyst.

A human analyst can interact with the secure enclaves 133, for example, by controlling the loading of data/validation of/unloading data associated with a single data source using the corresponding key pairs, or controlling the loading/unloading of untrained or trained machine learning data model architectures. As noted herein, because the secure enclaves 133 are adapted to prevent access to the underlying data sets by other parties, the secure enclaves 133 effectively provide a black-box access to an underlying data processing subsystem, or in some embodiments, an isolated machine learning data model architecture.

Figure 2B:
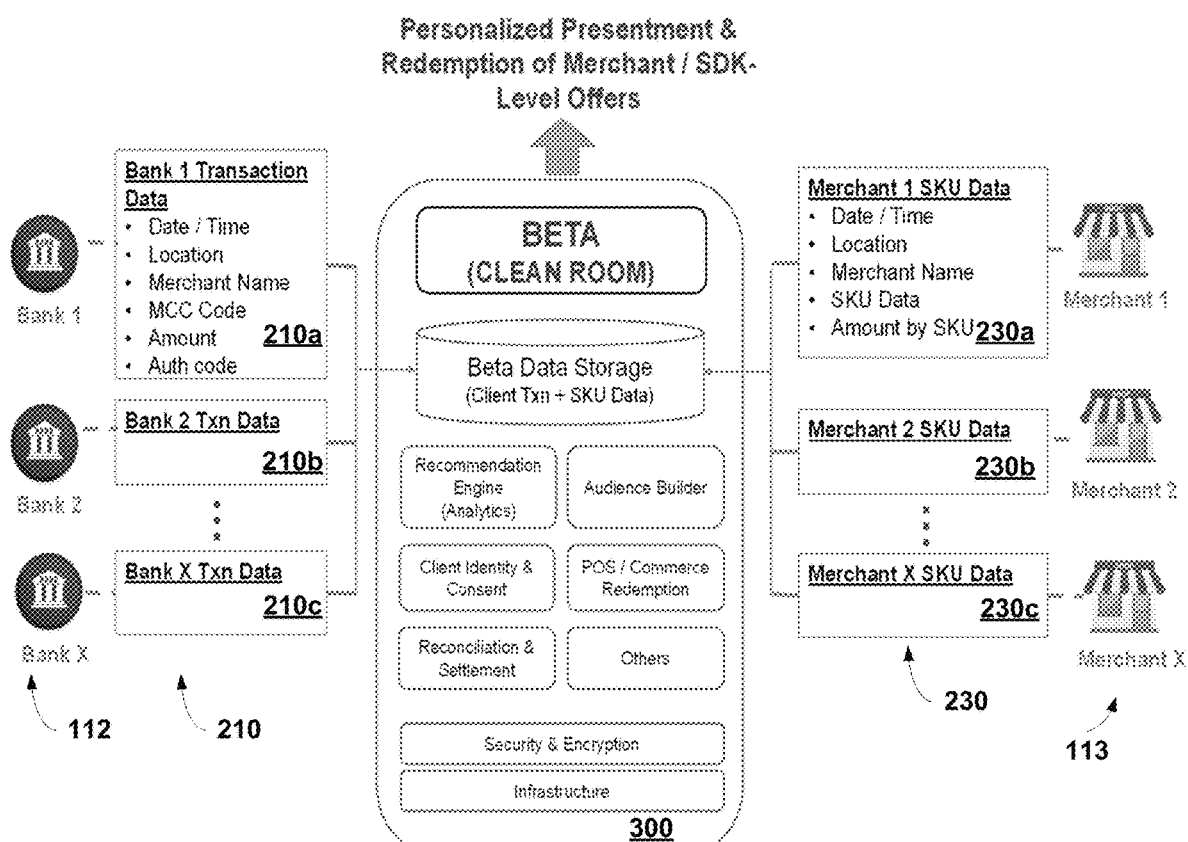
FIG. 2B is a schematic diagram of another example Clean Room on the platform for processing secure transaction data according to some embodiments.

Referring now to FIG. 2B, a Clean Room application 300 may be implemented on platform 100, and receive one or more data sets from a plurality of partners such as bank systems 112 and merchant systems 113. A bank system 112 may have consumer data relating to one or more financial products (e.g. credit cards) owned by a consumer. A merchant 113 may have consumer data relating to one or more transactions. Each time a consumer uses the financial product at a merchant, such as during a purchase transaction, various data are transmitted and stored at the bank system 112 and the merchant system 113.

For example, a bank may have, with respect to a transaction, a plurality of transaction data 210*a*, 210*b*, 210*c* including: data and time of the transaction, name and location of the merchant where transaction has occurred, a Merchant Category Code (MCC) associated the merchant, a bank name and ID, a masked primary account number (PAN) of the financial product, an amount charged to the financial product during the transaction, and authorization code for the transaction, which is a multi-character code sent by the bank at the end of the transaction.

For another example, a merchant may have, with respect to a transaction, a plurality of transaction data 230*a*, 230*b*, 230*c* such as data and time of the transaction, name and location of the merchant where transaction has occurred, a stock keeping unit (SKU) of product or service sold during the transaction, and a quantity or amount for each SKU sold.

In some cases, a merchant 113 may not have a physical retail store. For example, a merchant can be a web-based retailer and conduct transactions online.

Clean Room 300 may receive various consumer data, such as transaction data 210*a*, 210*b*, 210*c*, 230*a*, 230*b*, 230*c*, from bank systems 112, merchant systems 113, and other types of partner systems 115 (e.g. financial institutions that are not banks), and may generate recommendations and offers, such as personalized offers, based on the consumer data. The recommendations and offers may be sent to the partners and/or to consumers directly for redemption at Point-of-Sale (POS) or online. In some embodiments, recommendations and offers may only be generated if a consumer actively consents and choses to opt-in. If a partner chooses to participate and uses technologies offered by platform 100, then it may be generally assumed that the partner has obtained the appropriate consumer consent to use his or her data for generating suitable recommendations and offers by platform 100.

In some embodiments, a partner may have to request consent from one or more consumers to store their data through the partner's communication channel(s) with the consumer. For example, the terms and services of the partner mobile or web-based application may indicate that consent is given when the consumer uses the mobile or web-based application. In a merchant store, consent can be requested and given through a prompt on the payment or POS terminal.

Referring now to FIG. 3, which shows another schematic diagram of the Clean Room 300 on platform 100 according to some embodiments. Clean Room 300 is a secured environment housed in internal memory 109 of a processor 101. It may include Secure Enclaves 133 developed based on secure processing hardware provided by chip manufacturers to safely and securely store, decrypt and process data.

Clean Room 300 may receive, store, encrypt and decrypt consumer data. Platform 100 may allow partner systems 115 to share and transmit encrypted data into the Clean Room 300 without concerns of unauthorized access by a person, system or process. Clean Room 300 can give users control and their consent over the data being provided by the partner systems, and aware how the data will be used to produce a produce specific outcomes. Clean Room 300 also allows partner systems to transfer encrypted data into the Clean Room without concerns of unauthorized access of the date by a person, system or process.

Security and Encryption unit 125 may be configured to verify and certify Clean Room 300 for receiving and processing consumer data, to verify that each partner sending consumer data is authenticated, and to encrypt, decrypt, clean, normalize and store the consumer data when appropriate.

Recommendation engine 120 may be configured to generate recommendations and offers based on the consumer data received from partner systems 115. The recommendations and offers may be general or targeted. The recommendations and offers may be targeted for a group of consumers, or personalized for a particular consumer. In some embodiments, recommendation (analytics) engine may model partner data for the purpose of serving personalized and relevant merchant offers. Engine 120 may leverage the data model(s) to provide batched or triggered (e.g., location-based) personalized offers for consumers.

In some embodiments, Machine Learning algorithms and SQL Queries may be implemented by the engine 120 in an enclaved environment. For example, using Anjuna Security™ and H2O™.

Audience builder unit 121 may be configured to generate a list of consumers for each generated recommendation or offer. The list of consumers may include one or more consumers. Audience builder unit 121 may define a targeted audience on attributes such as age, location, marital status, merchant, and so on. The attributes may be correlated to available variables in the data sets stored in data storage 108.

Client Identity and Consent unit 122 may be configured to verify and confirm client identity and consent. A client system may need to give explicit consent prior to transmitting consumer data to platform 100. A client system may be a system configured to send queries to and receive answers from platform 100 in relation to the encrypted data. For example, a client system may refer to a partner portal 116 qualified (i.e., with proper permission) to seek processed data from platform 100.

POS/eCommerce Redemption unit 123 may be configured to present generated recommendations and offers to perspective consumers at a Point-of-Sale (POS) or at an online-based eCommerce website. The offers may be configured for immediate redemption if the consumer accepts it at the POS or eCommerce website.

Reconciliation and Settlement unit 124 may be configured to handle the clearing, settlement and reconciliation process of one or more transactions.

In some embodiments, a communication link (e.g. link A in FIG. 3) may be established between a partner and platform 100 prior to any data transmission. The communication link may be end-to-end encrypted such that any data sent or received using the link is secure and cannot be intercepted by a third party.

In some embodiments, a partner needs to be authenticated before the communication link may be established and secured. A communication link may be secured with a key. For example, all data to be transmitted using the communication link may be encrypted by an encryption algorithm or process, for example, using a cryptographic hash function which may be referred to as a key or an access key.

Such a cryptographic hash function may be known as a one-way hash function, that is, it may be, mathematically speaking, nearly impossible to invert. Input data to the encryption process may be known as "plain text", "input" or "message", whereas the output of the encryption process may be known as "output", "hash digest", "digest", or "hash value". An encryption may use an appropriate hash function. In some embodiments, the cryptographic hash function may be one of: MD5, SHA1, and SHA2.

In some embodiments, a public-private key pair may be used to encrypt the communication link. That is, once a partner's identity has been verified and authenticated, Security and Encryption unit 125 may establish a communication link with the partner, and send an access key (public key) to the partner using the communication link.

The partner may use the access key to encrypt all data being transmitted on the communication link. When Clear Room 300 receives the encrypted data through the communication link, a corresponding private key may be used to decrypt the data, so that they may be cleaned, normalized and processed accordingly.

Security and Encryption unit 125 may revoke or update the access key to a partner after a pre-set time duration. Security and Encryption unit 125 may also revoke or update the access key by partner(s) or by jurisdiction. In some embodiments, Security and Encryption unit 125 may also revoke or update the access key whenever a communication link is terminated or needs to be established.

In some embodiments, in addition to, or as an alternative of, end-to-end encryption of the communication link, a link encryption may be applied to the communication link with, for example, cryptographic protocols such as Transport Layer Security (TLS) or Secure Sockets Layer (SSL).

In some embodiments, prior to a partner system 115 transmitting any data to Clear Room 300, a partner may request to verify that platform 100 is authentic and has not been tampered with. This may be achieved by a remote attestation process. A remote attestation process may allow platform 100 to authenticate itself and present that the hardware and software used to run platform 100 and Clear Room 300 are reliable, trustworthy and have not been tampered with.

A data transfer protocol may be applied between partner system 115 and platform 100. For example, the information exchange protocol may be an Application Layer channel encryption, similar to TLS/SSL. At the beginning of a session, the two parties authenticate to one another. A key exchange may be piggy-backed on this process and thus two shared keys are established, each for data flow from one party to the other.

A key exchange mechanism may be used for data encryption. For example, a Diffie-Hellman Key Exchange on the SECP256R1 (PRIME256v1) Elliptic Curve may be implemented. The result of this key exchange is 256 bits of shared randomness. This shared secret directly or its SHA256 hash can be broken up into two 128 bit AES keys for the two streams.

Data may be encrypted by AES-GCM (Advanced Encryption Standard-Galois/Counter Mode), an authenticated encryption mechanism that applies the AES block cipher in Galois Counter Mode. The use of authenticated encryption guarantees confidentiality and authenticity of data communicated between parties. The Nonce (also known as Initialization Vector) used for GCM is 12 bytes long, starting at all zeros and incrementing after each message in a little endian fashion. After the $2^{96}$ possible nonces are exhausted, the corresponding encryption key is "run out" and is replaced by a newly negotiated one. In some embodiments, the encryption may after the $2^{96}$ possible nonces are exhausted.

Authentication Methods and Malicious Input

A Remote Attestation mechanism may be used to authenticate and establish a secure communication channel, whereby a remote client (e.g. a partner system 115) may ensure they are communicating with a particular piece of code running in enclave mode on an authentic non-compromised processor of platform 100. Remote Attestation can also be used by the enclave to send a public key to the client in a non-malleable way. This mechanism relies on highly non-trivial group signatures, but is also based on highly peer-reviewed research.

In some embodiment, the client or the partner system may include a Python script containing modules for establishing a secure encryption channel with the platform 100, and converts input data into a canonical form to be consumed by the Clean Room 300.

Remote Attestation may constitute the root of a client's trust in the analytics service. There are three ways it may be integrated with key exchange:
1. Perform Remote Attestation each time, or at least once per client. In this case the enclave will not have a long-lived public key, and would directly place a Diffie Hellman message on Remote Attestation's payload.
2. Enclave to present a Remote Attestation Transcript. Remote Attestation is by nature an interactive protocol, designed to convince only the verifier it interacts with. However, if all verifier challenges are produced deterministically using a strong hash function, the protocol is turned into a non-interactive one, through which a single execution can convince any number of verifiers. This transformation is known as the Fiat-Shamir Heuristic. A thus transformed protocol can be carried out by the untrusted enclave host itself. The enclave authenticates by presenting this protocol transcript similar to a public key certificate and signing a challenge and its new Diffie Hellman message by the public key embedded in the Remote Attestation transcript.
3. Certificates: Clients can delegate Remote Attestation verification to a 3rd party and consume certificates issued by them. This is not a very promising option.

The client or partner system may authenticate to platform 100. Authentication may help control the in-flow of data limits, though by no means eliminates, the likelihood of injecting garbage data into the system or mounting sensitivity attacks. These attacks merit a short exposition: injecting garbage can be done in order to either take the system down, or deliberately generate false analytics results from which the attacker may benefit; and sensitivity attacks are more subtle.

An attacker may observe how the end result of analytics changes relative to changes in the input they provide and through observing the output provided to them infer more information about data provided by other parties than intended by the designers. In some embodiments, in order to counter potential attacks, offer presentment need to be carefully crafted and information presented to client institutions may be limited.

In some embodiments, a library like OpenSSL may be implemented with the following considerations: Best enclave-design practices calls for simplicity and minimalism. Therefore, functionality that cab be securely delegated to an untrusted component, should be delegated as such. In the context of SSL, transformation of native representation of algebraic objects (such as public keys and ciphertexts) into standard ones and policy checks are such tasks.

As discussed earlier, the service authenticates to the client in a way that diverges from what is practiced in 2-way SSL connections. That is, the SSL specification as implemented may allow for modularly switching to a user-defined authentication protocol.

Figure 4:
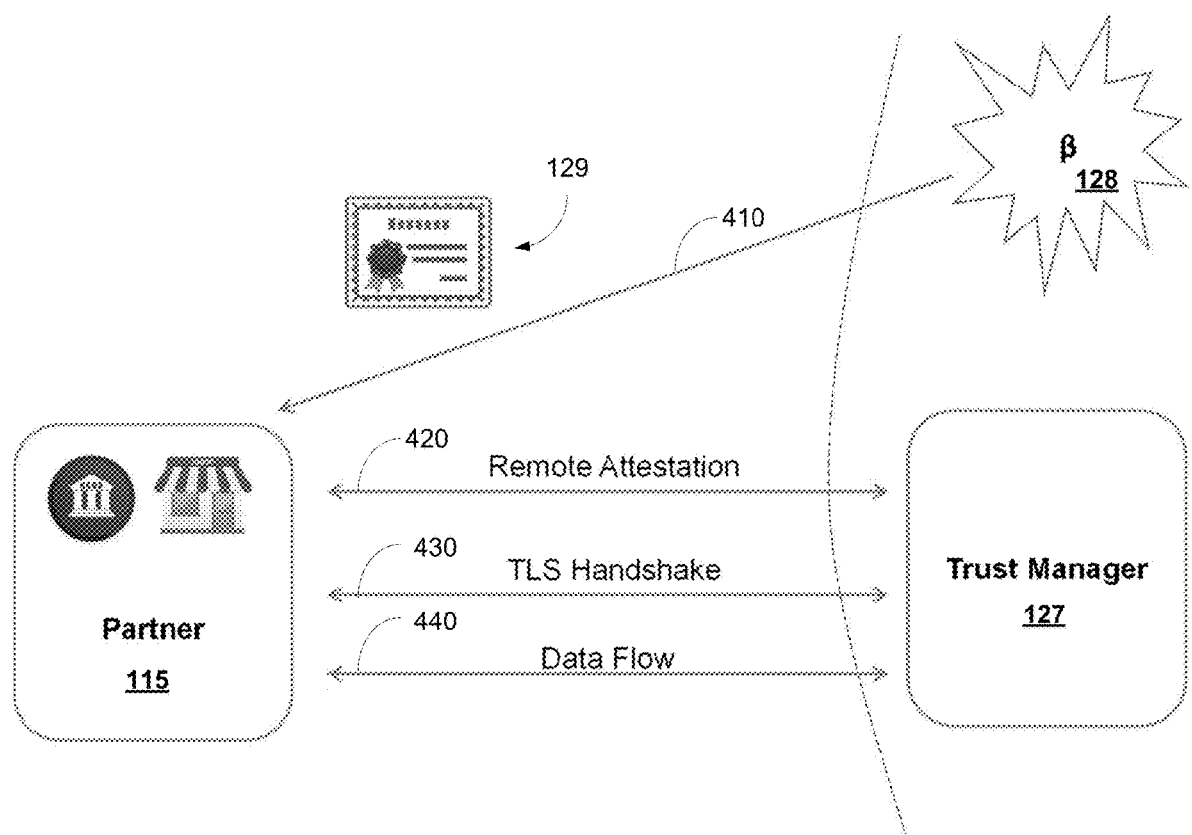
FIG. 4 is a schematic diagram illustrating a remote attestation process between a partner and a trust manager of the example platform according to some embodiments.

FIG. 4 shows a schematic diagram illustrating a remote attestation process between a partner system 115 and a trust manager utility 127 of Security and Encryption unit 125. At step 410, a Certificate Manager utility 128 can issue a Public Key Certificate 129 for each partner. The certificate 129 may be used to prove to the Trust Manager 127 that incoming data is authentic.

At step 420, upon request from a partner system 115, trust manager 127 may initiate a remote attestation process with the partner system 115 to verify the authenticity of platform 100. The request from partner system 115 may include a nonce N (a non-predictable random value) that has been generated for the purpose of remote attestation. Trust manager 127 receives the request including the nonce N, and in turn sends the nonce and a request to a Trusted Platform Module (TPM) 135 on platform 100 for key attestation.

A TPM 135 is designed to provide hardware-based security-related functions. A TPM 135 may include multiple physical security mechanisms to make it tamper resistant, and others are unable to tamper with the functions of the TPM 135.

TPM key attestation uses an Endorsement Key (EK) unique to each TPM 135 and is generated at manufacturing. The trust in the EK is based on the secure and tamper-proof storage of the EK in the TPM 135 and on the fact that the EK's certificate chains to the TPM manufacturer's issuing Certificate Authority (CA). That is, the EK's certificate can be cryptographically verified by the TPM manufacturer's issuing CA. One or more Attestation Identify Key (AIK) may be generated by the TPM 135 and signed with the EK. The AIK can be verified by a trusted Certificate Authority.

In some embodiments, the request from Trust Manager 127 to a TPM 135 includes one or more current Platform Configuration Register (PCR) values of platform 100. The request may optionally include a TPM version number or any other information required for TPM 135 to sign the PCR values. PCR values are used primarily to store system measurements and cannot be arbitrarily overwritten. PCR values may be hash values which are computationally impossible to forge. Some PCR values may be reset to a default value, which would require proper permission.

TPM 135 receives the request from Trust Manager 127 and proceeds to sign the PCR values with an Attestation Identify Key (AIK), then sends a Signed Response including the nonce, the PCR values and the AIK back to Trust Manager 127. Trust Manager 127 then sends the Signed Response to partner system 115, which may have a Partner Portal 116 installed thereon for analyzing and verifying the Signed Response.

Partner system 115 receives the Signed Response, verifies that the signed data is authentic and trustworthy by verifying that the PCR values and the AIK signature are accurate. For example, partner system 115 may verify that the AIK is valid through a trusted Certificate Authority. For another example, partner system 115 may verify the PCR values are trustworthy by comparing the values to stored values in a database which maps PCR values to a trust level. Partner system 115 may further verify that the PCR values are current by checking that the nonce in the Signed Response corresponds to the nonce sent by the partner in its initial request for attestation.

In some embodiments, instead of PCR values, another hash value may be used, such as a hash value of software code of platform 100, where the hash code represents a current state of platform 100.

Once partner system 115 is satisfied, based on the Signed Response, that the Clear Room 300 running on platform 100 is authentic and trustworthy, a SSL/TLS handshake may occur at step 430 in order to establish a secure communication channel.

At step 440, encrypted data may be transmitted from partner system 115 to platform 100 using the secure communication channel. In some embodiments, a public-private key pair may be used to encrypt the data. As described herein, Security and Encryption unit 125 may send an access key (public key) to partner system 115 using the communication channel. The partner may use the access key to encrypt all data being transmitted on the communication channel. When Clear Room 300 receives the encrypted data through the communication channel, a corresponding private key may be used to decrypt the data, so that they may be cleaned, normalized and processed accordingly. Partner portal 116 (see FIG. 5) may store the public key(s) assigned to partner system 115 in a partner keystore. Clear Room 300 may store the corresponding private key to each public key in a keystore 130. Keystore 130 may store a plurality of private keys, each corresponding to a public key that is assigned to a partner. A partner system 115 may be assigned one or more public keys for encrypting data.

In some embodiments, since arbitrary-length strings may make encrypted data identifiable, data sets may be pre-processed prior to transmission. For example, one or more data strings may be padded to a specific length, such as a maximum length allowed by the system. In other embodiments, data strings may be broken down to a predefined structure, and each atomic component may be hashed or encrypted prior to transmission.

Figure 14:
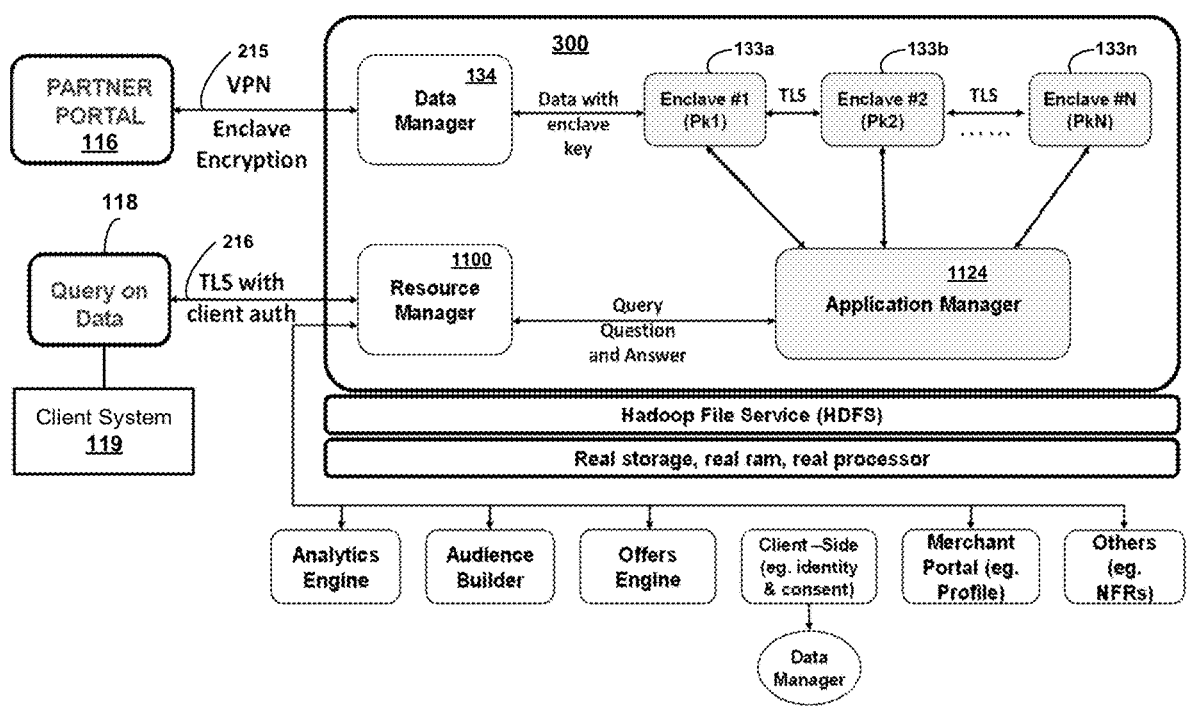
FIG. 14 illustrates another schematic diagram of an example Clean Room on the platform for processing secure transaction data according to some embodiments.

FIG. 14 shows another schematic diagram of an example Clean Room 300 for processing secure transaction data according to some embodiments. Clean Room 300 may include a Data Manager 134 configured to send public key of one or more enclaves to a partner portal 116 for encryption of data at the partner portal. The enclaves 133a, 133b, 133n may be referred to as destination enclaves as each enclave may be selected by Data Manager 134 to be a destination of encrypted data from partner portal 116. A file system such as Hadoop File System (HDFS) may be included in Clean Room to manage the encrypted data stored by the enclaves 133a, 133b, 133n.

In some embodiments, a partner portal 116 may initiate a communication channel 215 thru TLS or VPN with Data Manager 134 for sending data to Clean Room 300. The partner portal 116 may first transmit to Data Manager 134 a request indicating that data is to be transmitted to Clean Room. In some embodiments, the request may include information representative of an amount of data to be transmitted. Based on the data request, Data Manager 134 may select one or more destination enclaves 133a, 133b, 133n for receiving the incoming data from partner portal 116.

In some embodiments, Data Manager 134 may select the destination enclaves based on the amount of data to be ingested by each enclave, such that each selected destination enclave is specified to receive a specific amount of data from partner portal 116 through this communication session. In addition, Data Manager 134 may select a public key for each of the destination enclave and send the one or more public keys, each corresponding to a selected destination enclave, to partner portal 116, so the partner portal can encrypt raw data using the appropriate public key prior to transmission of encrypted data via communication channel 215. For example, Data Manager 134 can send information representative of an upper limit of data amount to be received by each destination enclave and corresponding public key (e.g. "MaxSize, PublicKeyID"), so partner portal 116 can encrypt the appropriate amount of incoming data for each destination enclave, in a manner that is consistent with the requirements of the destination enclaves.

Once partner portal 116 receives the information representative of data amount, destination enclave(s) and public key(s) from Data Manager 134, partner portal 116 may proceed to encrypting the raw data. For example, partner portal 116 may randomly generate a 256 bit Data Encryption Key (DEK) for each destination enclave and encrypts some raw data with the respective DEKs using AES-256 CBC or GCM. Partner portal 116 may generate DEKs based on the number of destination enclaves and corresponding number of public keys. A different DEK may be generated for each destination enclave, and thus for each public key associated with the destination enclave. Partner portal 116 may then encrypt each of the DEKs using an appropriate public key based on the corresponding destination enclave for which the DEK is generated. Next, partner portal 116 may send the encrypted data along with the encrypted key (e.g. encrypted DEK) to Data Manager 134 via communication channel 215.

In some embodiments, the communication channel 215 may be a VPN communication channel, in which case partner portal 116 and Clean Room 300 have both been verified to be authentic.

In some embodiments, the communication channel 215 may be established and maintained under TLS, similar to the TLS channel between a partner system 115 and a trust manager utility 127 of Security and Encryption unit 125, as described above in relation to FIG. 4.

A client system 119 may submit a query 118 to resource manager 1100 on Clean Room 300. The query may be a data query sent through communication session 216. In some embodiments, a client system 119 must be an authorized party to Clean Room 300 in order to send data queries; to this end, resource manager 1100 may be configured to interact with the client system to ensure that the client system is an authorized party and has proper permission for the query. Resource manager 1100 may return an answer to the client system in response to the query, once the client system has been verified to have the proper permission for the query.

In order to send the data query, the client system may initiate an authenticated TLS communication session 216 with resource manager 1100. The communication session 216 may be established and maintained in a manner similar to the TLS channel between a partner system 115 and a trust manager utility 127 of Security and Encryption unit 125, as described above in relation to FIG. 4.

Through the TLS communication protocol, resource manager 1100 can verify that the client system is an authorized party to Clean Room 300. Once the client system has been verified as an authorized party, resource manager 1100 may transmit, and display at the client system, one or more data analytics to which the client system has access. The client system may elect one or more options from the displayed data analytics options. Some of the data analytics may require additional information, which the client system may be configured to supply. The client system may then send the complete data query to resource manager 1100.

Resource manager 1100 may receive the data query from the client system, and proceed to send the query to application manager 1124 in order to launch the data analytics based on the data query from the client system. Application manager 1124 may be an application configured to generate one or more enclaves 133a, 133b, 133n in order to run analytics on the encrypted data using the enclaves. In some embodiments, one or more worker nodes may be used to perform the required data analytics.

In some embodiments, one or more data analytic operations may be open for inspection and/or signed by all authorized parties participating in Clean Room 300 to assure the authorized parties that the Clean Room is secure and intact.

In some embodiments, enclaves 133a, 133b, 133n may have authenticated and encrypted communication between data/documents stored thereon. For example, between one or more pair of enclaves 133a, 133b, 133n, TLS communication channel may be established to ensure secure communication and exchange of data between the enclaves.

Figure 15:
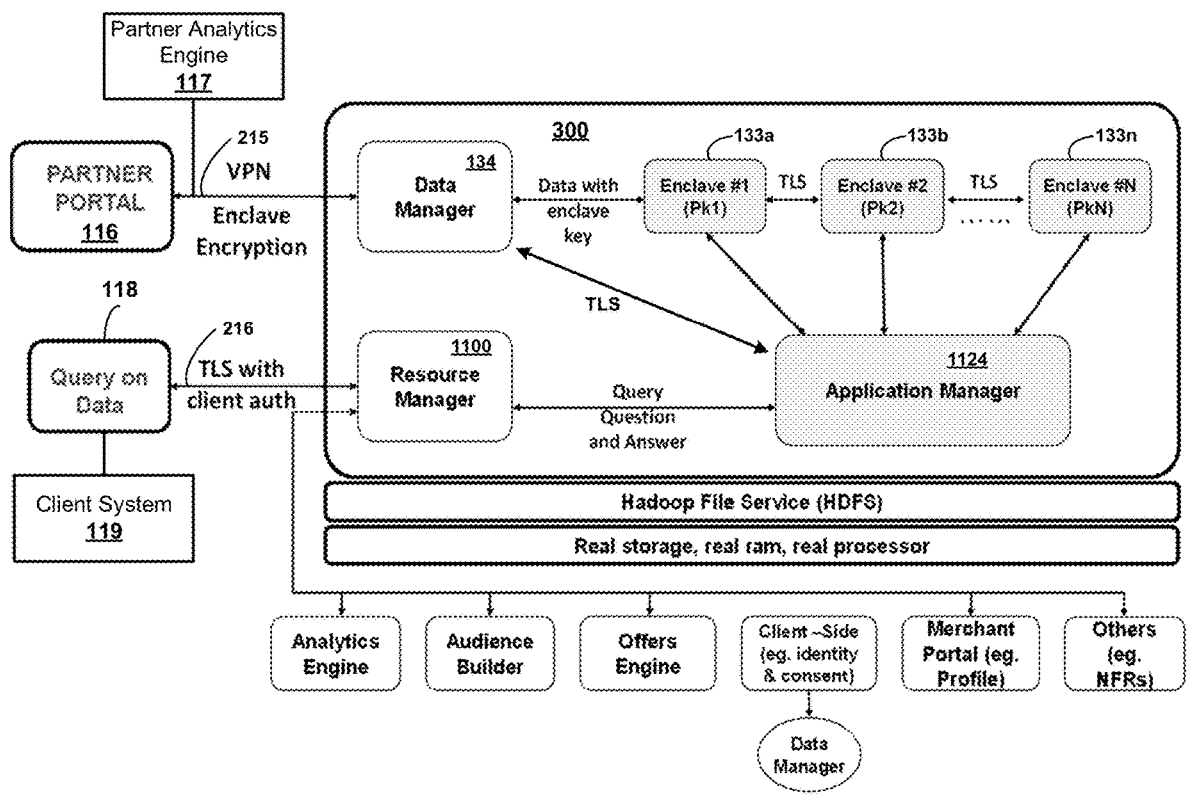
FIG. 15 illustrates yet another schematic diagram of a distributed system including a Clean Room for processing secure transaction data according to some embodiments.

FIG. 15 illustrates a schematic diagram of a distributed system including a Clean Room 300 for processing secure transaction data according to some embodiments. Clean Room 300 may include a Data Manager 134 configured to send public key of one or more enclaves to a partner portal 116 for encryption of data at the partner portal. The enclaves 133a, 133b, 133n may be referred to as destination enclaves as each enclave may be selected by Data Manager 134 to be a destination of encrypted data from partner portal 116. A file system such as Hadoop File System (HDFS) may be included in Clean Room to manage the encrypted data stored by the enclaves 133a, 133b, 133n.

In some embodiments, a distributed model may be implemented using Clean Room 300, where partner portal(s) 116 may maintain their respective data, perform some or all of data analytics using a data engine connected to the partner portal 116 behind a firewall, and only the necessary analytics results, such as metadata, is sent to Clean Room 300 for further processing.

Similar to a data query 118 from the system illustrated in FIG. 14, a query request 118 from a client system 119 may be sent to the Resource Manager 1100. The query request 118 may include a query for data analytics.

In order to send the data query 118, the client system 119 may initiate an authenticated TLS communication session 216 with resource manager 1100. The communication session 216 may be established and maintained in a manner similar to the TLS channel between a partner system 115 and a trust manager utility 127 of Security and Encryption unit 125, as described above in relation to FIG. 4. Through the TLS communication protocol, resource manager 1100 can verify that the client system 119 is an authorized party to Clean Room 300. Once the client system 119 has been verified as an authorized party, resource manager 1100 may transmit, and display at the client system, one or more data analytics to which the client system has access. The client system may elect one or more options from the displayed data analytics options. Some of the data analytics may require additional information, which the client system 119 may be configured to supply. The client system 119 may then send the complete data query to resource manager 1100.

The query request 118 may be then sent to Application Manager 1124, which may subsequently launch data analytics based on the data query 118. Application Manager 1124 may determine data analytics required based on data query 118. Application Manager may also determine the types and source of data required to perform data analytics needed to respond to data query 118. In some embodiments, Application Manager 1124 may retrieve or receive a table mapping each partner to its respective data. Application Manager may further generate detailed instructions for each partner, including type of data analytics required and type of data required from each partner. The instructions may be sent to Data Manager 134 via a secure channel (e.g. TLS), which can then send the instructions to one or more partner portals 116 via TLS or VPN connection 215.

Upon receiving the instructions, each partner portal 116 may retrieve the necessary and appropriate data from a database (not illustrated), which may be part of, or connected to partner portal 116. The partner portal may then perform the appropriate data analytics, based on the instruction from Data Manager, on a data engine, such as partner analytics engine 117. Partner analytics engine 117 may be part of, or connected to, partner portal 116. In some embodiments, partner analytics engine 117 may be a data engine provisioned and configured by Clean Room 300, but installed at the same physical site as partner portal 116. Partner analytics engine 117 may be installed behind a firewall of partner portal 116, such that in order for Data Manger to send instructions to engine 117, a TLS or VPN connection 215 needs to be established and in some embodiments, encryption is required for transmission of data.

Partner analytics engine 117 may perform the appropriate data analytics required by Data Manager, generates data output or data results, which may be then encrypted and transmitted to the Data Manager 134. The Data Manager may then, upon instruction from Application Manager, send the encrypted data results to one or more enclaves 133a, 133b, 133n.

In some embodiments, partner analytics engine 117 may first send the data results to Partner Portal 116, which may then send the data results to Clean Room 300 via Data Manager 134.

In some embodiments, Data Manager 134 may select the destination enclaves based on the amount of data to be ingested by each enclave, such that each selected destination enclave is specified to receive a specific amount of data from partner portal 116 or partner analytics engine 117 through this communication session. In addition, Data Manager 134 may select a public key for each of the destination enclave and send the one or more public keys, each corresponding to a selected destination enclave, to partner portal 116, so the partner portal can encrypt raw data results using the appropriate public key prior to transmission of encrypted data via communication channel 215. For example, Data Manager 134 can send information representative of an upper limit of data amount to be received by each destination enclave and corresponding public key (e.g. "MaxSize, PublicKeyID"), so partner portal 116 or partner analytics engine 117 can encrypt the appropriate amount of incoming data for each destination enclave, in a manner that is consistent with the requirements of the destination enclaves. Once partner portal 116 or partner analytics engine 117 receives the information representative of data amount, destination enclave(s) and public key(s) from Data Manager 134, partner portal 116 or partner analytics engine 117 may proceed to encrypting the raw data results and sending the encrypted data results to Data Manager 134 via connection 215.

In some embodiments, the communication channel 215 may be a VPN communication channel, in which case partner portal 116, partner analytics engine 117 and Clean Room 300 have both been verified to be authentic.

In some embodiments, the communication channel 215 may be established and maintained under TLS, similar to the TLS channel between a partner system 115 and a trust manager utility 127 of Security and Encryption unit 125, as described above in relation to FIG. 4.

In some embodiments, the data results sent back to Data Manager 134 may include metadata, or other types of data. In some embodiments, further data analysis may be required to complete the data query based on the data results sent from one or more partner portal 116 and/or partner analytics engine 117. Application Manager 1124 may instruct the appropriate number of secure enclaves 133a, 133b, 133n to complete the analysis based on the data results sent from the partners. Application manager 1124 may, in some embodiments, be an application configured to generate one or more enclaves 133a, 133b, 133n in order to run analytics on the encrypted data using the enclaves. In some embodiments, one or more worker nodes may be used to perform the required data analytics.

A final data result may be generated by Clean Room 300, and returned to the client system 119 which sent the original data query 118 through the Resource Manager 1100 using a secure communication channel 216, which may be an encrypted channel.

In some embodiments, instead of transmitting the final data result back to client system, Clean Room 300 may instead perform an action based on the final data result on behalf of the client system.

In some embodiments, one or more data analytic operations may be open for inspection and/or signed by all authorized parties participating in Clean Room 300 to assure the authorized parties that the Clean Room is secure and intact.

In some embodiments, enclaves 133a, 133b, 133n may have authenticated and encrypted communication between data/documents stored thereon. For example, between one or more pair of enclaves 133a, 133b, 133n, TLS communication channel may be established to ensure secure communication and exchange of data between the enclaves.

In one very simple example, each partner 116 may each have a set of data including a set of numbers, and a client sends a data query requesting the smallest number among all partners. Application Manager may instruct each partner to run its own analytics on its own data using partner analytics engine 117, which generates a respective smallest number per partner based on the set of data belonging to the respective partner. This results may be then encrypted and sent to Application Manager in Clean Room, which then run a final data analytics comparing the respective data results from all partners, and generates a final result including the smallest number among all the respective smallest numbers sent by each partner. In this case, Clean Room does not access partner data in its entirety, but simply a metadata or data output based on the set of data each partner has.

In another example, a client system 119 may send a data query 118 to find out the top one hundred consumers who have spent the most amount of money in the past three month on a commodity, such as chocolate. Resource Manager 1100 may receive this query, forwards to Application Manager 1124, which then determines the specific partner portals for performing the data query, and generates appropriate instruction on data analytics to each partner. Application Manager may select, based on an internal or external knowledge database, one or more partners that are known to have a large number of consumers who may spend money on chocolate. For example, Application Manager may select vendors that are chocolatiers, or who sell a large amount of chocolate based on existing sales information.

The instruction on data analytics, which may include the types of data required as well as the types of data analytics required, along with a list of selected partners, may be sent to Data Manager 134 via TLS connection 215, and the Data Manager 134 may send each respective instruction to each selected partner via a TLS or VPN connection with a set of public/private key for data encryption. In some embodiments, the instruction may be encrypted prior to being transmitted to each partner or each partner analytics engine.

Each partner analytics engine 117 may receive the instruction from Data Manager 134, and proceed to perform the requested data analytics in accordance with the instruction received. The partner analytics engine may retrieve the appropriate data from each partner portal, if needed, in order to perform the data analytics specified in the instruction.

Data results from each partner analytics engine 117 may then be sent to respective partner portal 116 for encryption and transmission to Clean Room 300, which may perform additional data analytics to generate a final result representing the top one hundred consumers who have spent the most amount of money in the past three month on chocolate. For example, a data result from a respective partner 116 may include a top fifty consumers who spent the most amount of money on chocolate in the last three months, as well as the respective amount of money each consumer spent.

A data result from another respective partner 116 may include a top X number of consumers (e.g. thirty or one hundred) who spent the most amount of money on chocolate in the last three months, as well as the respective amount of money each consumer spent. Clean Room 300 may then determine the top one hundred consumers who spent the most amount of money on chocolate in the last three months among all partners who have sent in the data results.

In some embodiments, Clean Room 300 may send this data result back to client system 119 via connection 216. In other embodiments, Clean Room 300 may withhold this data result from client system 119, and instead send coupons for chocolate to this list of consumers, who may be interested in purchasing more chocolate using the coupon or promotional offer.

Figure 5:
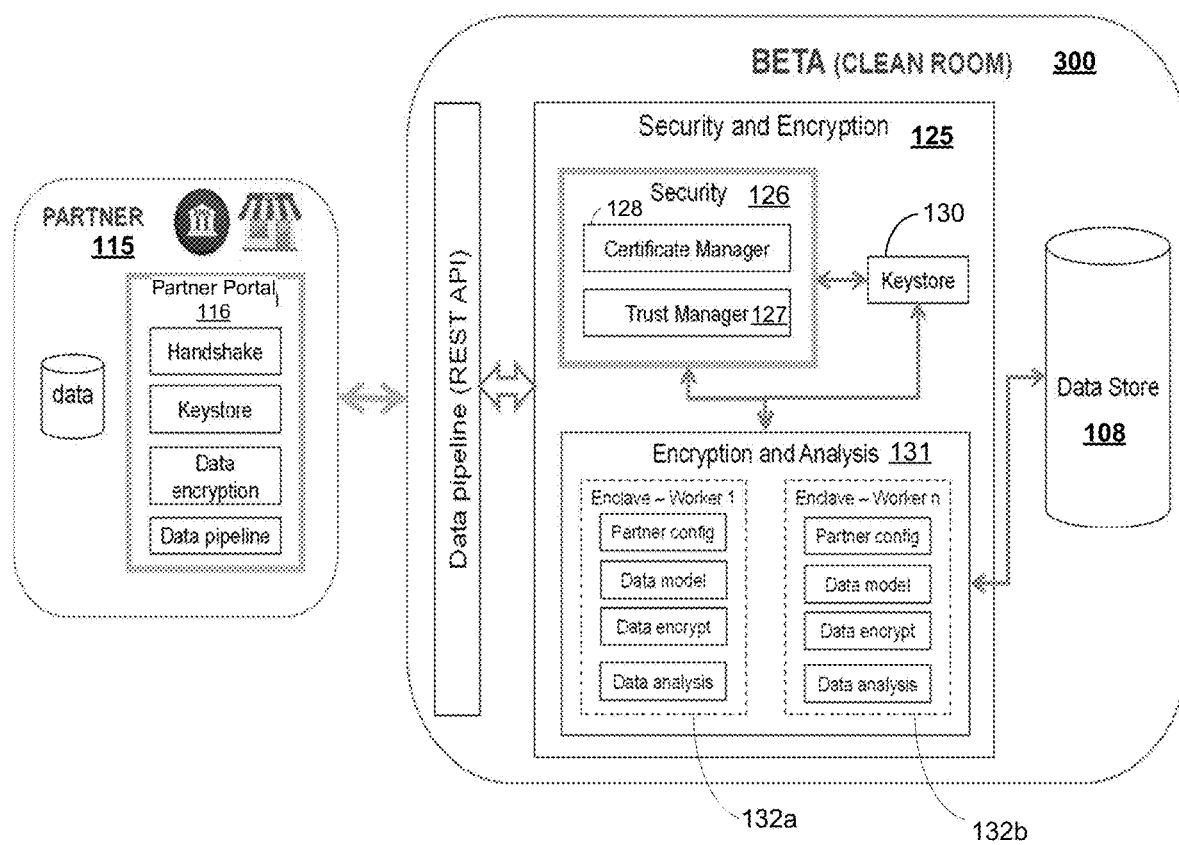
FIG. 5 is a schematic diagram of a security and encryption unit from the example platform according to some embodiments.

Referring now to FIG. 5, which shows an example security and encryption unit 125 and a data storage 108 of Clear Room 300. In some embodiments, each partner 115 allows a minimum set of data to be stored in data storage 108 of Clear Room 300. At the same time, none of the partners can access nor view the aggregated data, even though a partner may request one or more actions available through the portal 116. For example, a partner 115 may request platform 100 to target specific user groups for new offers. For another example, a partner may request platform 100 to analyze what the spending trend is for a specific demographic group of users.

A partner system 115 in some embodiments may include a partner portal 116. Partner portal 116 may be configured to encrypt consumer data using a public key and to transmit the encrypted data to platform 100. Partner Portal 116 may allow partners such as banks and merchants to generate and/or store keys and certificates, and to talk to the Clean Room APIs. Partner systems 115 may provide required JSON data fields when providing consumer data to Clean Room 300.

Once the encrypted data arrives at platform 100 from partner portal 116, it goes through a data pipeline API, and is then processed for storing in data store 108. Encryption and Analysis unit 131 may have multiple worker applications or nodes in one or more secure enclaves 133, each in a respective and separate secure enclave 133, for processing the incoming consumer data. In some embodiments, each worker application or node may process consumer data specific to one partner. That is, each partner may have a dedicated worker node 132a, 132b in one or more secure enclaves 133 in Clear Room 300 processing the consumer data from that specific partner.

A single worker application or node 132a, 132b in a secure enclave 133 may decrypt and analyze data stored in secure data warehouse 108. Each worker node 132a, 132b may include a partner configuration unit, a data model unit, a data encryption/decryption unit and a data analysis unit. The partner configuration unit may include information that is specific to the partner, for example, the partner configuration unit may provide a data schema template mapping incoming data from the partner to a respective data attribute, data type, data field and/or data size.

Data encryption unit may be configured to encrypt one or more data sets into encrypted content based on an encryption technique or algorithm. In some embodiments, encryption unit determines, retrieves or generates an appropriate key to encrypt one or more data sets in order to generate encrypted data elements. Each key used for encryption may be stored in keystore 130.

Data decryption unit may be configured to decrypt one or more encrypted data sets into plain text based on an encryption technique or algorithm, along with a key. In some embodiments, data decryption unit determines, retrieves or generates an appropriate key to decrypt one or more encrypted data sets in order to generate the plain text.

Data analysis unit may be configured to perform analysis on decrypted data.

In some embodiments, a minimum set of required data fields or attributes needs to be provided by each partner. For example, the minimum set of data may include time and data of transaction, merchant name, bank name and ID, MCC, auth code, consumer name (if known), and a masked PAN. Any additional data sent by the partner may be stored for future use.

A partner system 116 may transmit the consumer data in batches, for example, a large amount of data may be pushed to platform 100 via secure communication channel in one or more batches when a partner first signs up with Clear Room 300. Often, an initial batch of data from a partner may include data spanning multiple days, months or years, which may be analyzed to yield valuable insights into consumer behaviours. Data batches may also occur when deemed appropriate by platform 100, or during set intervals (e.g. every month).

A partner may also transmit consumer data in real time or near real time as transactions occur (e.g. when a consumer makes a purchase at a store).

A data model unit is configured to conduct data modeling and data normalizing steps after the data has been decrypted. The data model unit can schedule a data normalization job every once in a while, such as every X number of hours or days, to port new decrypted data to the model. The data model unit can also schedule a model training job every time the data normalization job modifies the normalized data, in order to prune the data model.

In some embodiments, data storage 108 may be scalable as needed.

Figure 6:
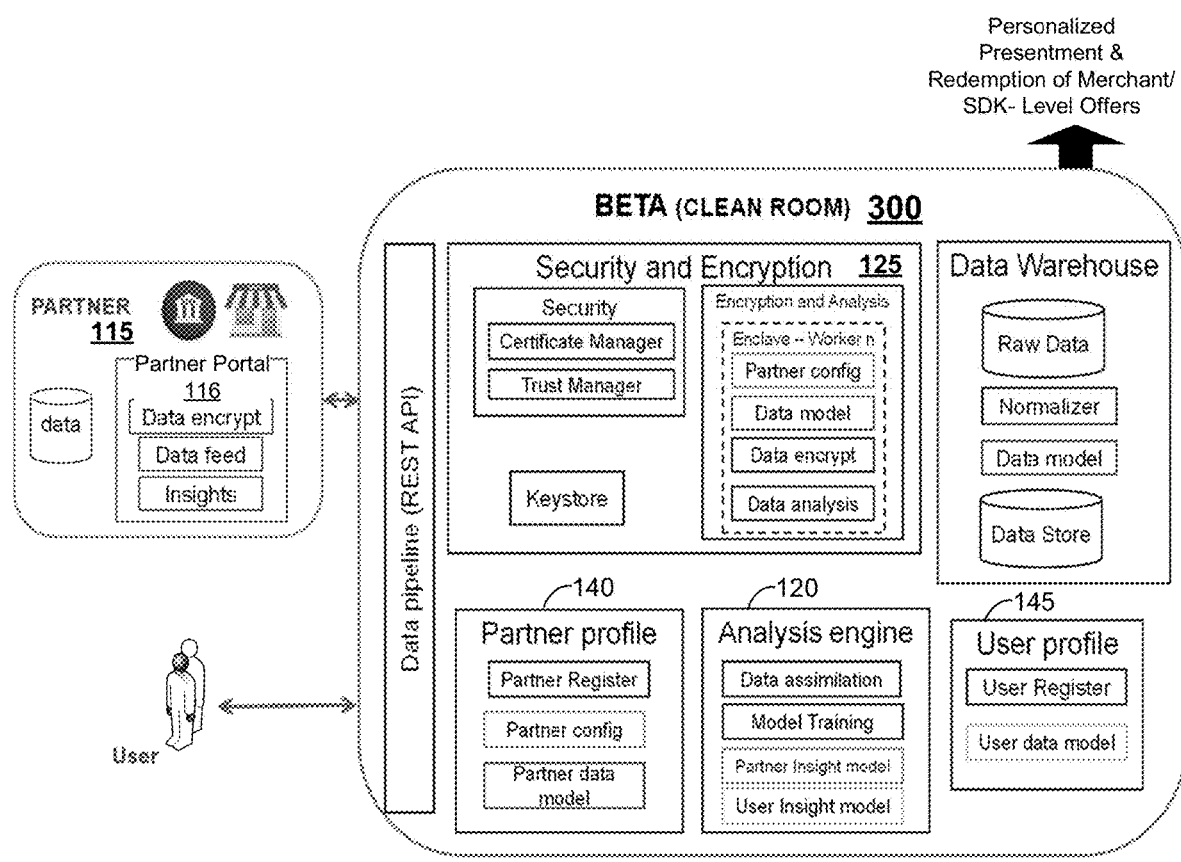
FIG. 6 is yet another schematic diagram of the example platform according to some embodiments.

FIG. 6 is another schematic diagram showing various components of Clean Room 300. In some embodiments, Clean Room 300 may include a partner profile 140 and a user profile 145. Users may refer to consumers. Partner profile 140 may include a Partner Register which includes registration details of a partner. User profile 145 may include a User Register which includes registration details of a user. Each partner may has a partner profile 140 and each user may have a user profile 145. Each partner and user may have its own respective data model as determined by data model unit in data warehouse.

Figure 7:
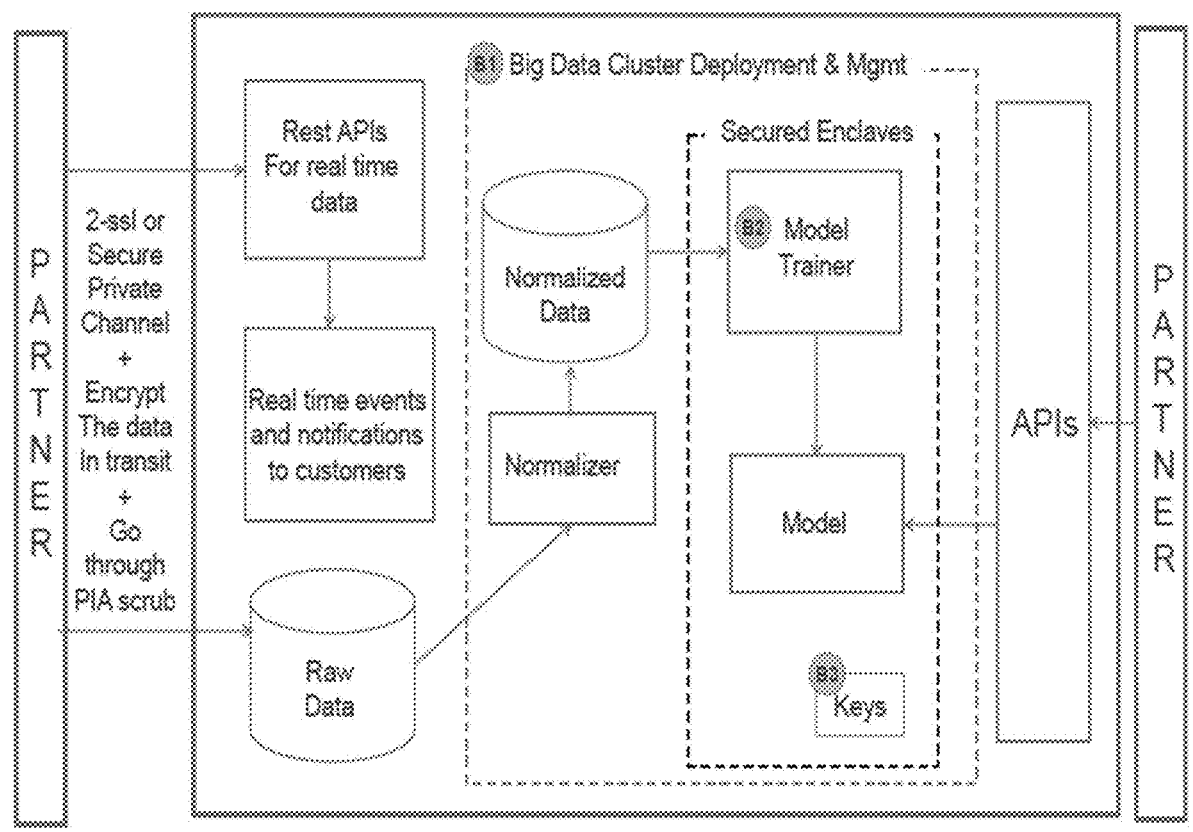
FIG. 7 is a schematic diagram of a data modeling unit and a data storage unit from the example platform according to some embodiments.

FIG. 7 shows a schematic diagram of a data modeling unit and a data storage unit 108 for data cluster deployment and management. As can be seen, data model trainer, data model, and the encryption/decryption keys may be stored in secure enclaves for extra security. Received consumer data may be decrypted and stored as raw data, which may be then normalized and stored as normalized data. Normalize data may be sent to a model trainer within the secure enclave 133 and further processed by the model trainer. Since different partners may have different data sets, the data sets need to be normalized prior to being aggregated and analyzed.

In some embodiments, the system can map the transactions and SKU data to (i) specific consumer; and/or (ii) prescribed segmentations (e.g. postal code, merchant, current location). For example, consumer data may be mapped between a bank system 112 and a merchant system 113 based on one or more data fields. For instance, authorization code and/or MCC may be used to link transaction data for a transaction from a bank to transaction data for the same transaction from a merchant, as the MCC and authorization code are common between a bank and a merchant for the same transaction. A security concern with using auth code may be that observing the shuffle operation's data flow leaks information about the auth codes. In some embodiments, nodes may be configured to randomize bin assignment once in a while, either as determined appropriate by Clean Room 300, or on a per-many-job basis.

Figure 9:
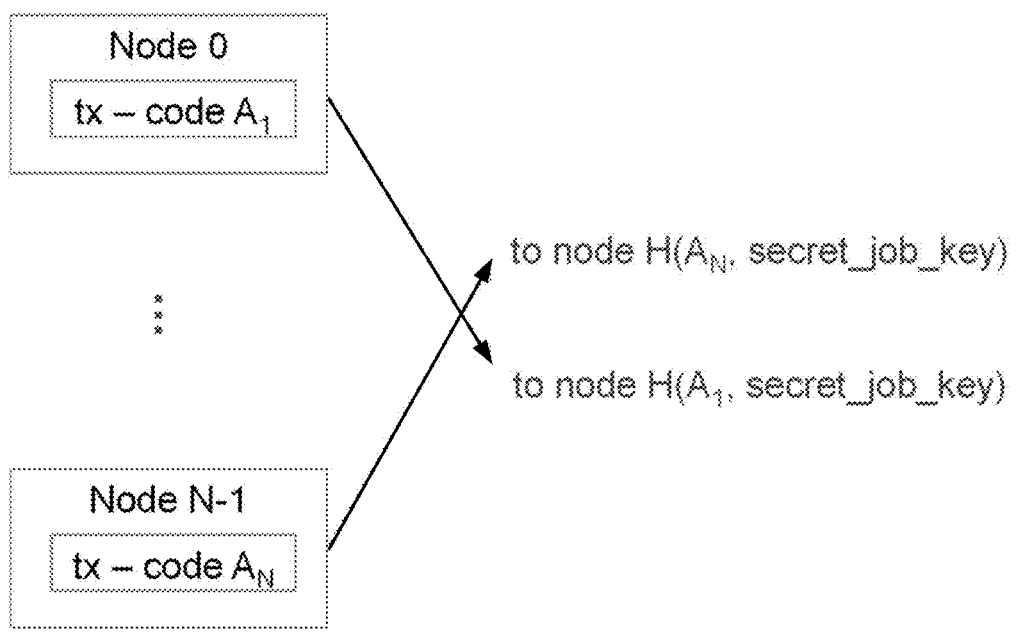
FIG. 9 shows example job assignments for various nodes according to some embodiments.

In some embodiments, the nodes can be configured to shuffle the order of incoming authorization codes as illustrated for example in FIG. 9, which shows a Secret Job Key to be distributed among workers by a protected component within a driver node at the beginning of a job.

For another example, if the PAN of the financial product is available, the transaction can be mapped between the bank and the merchant using the card PAN. However, it is highly unlikely the PAN is captured due to PCI compliance, although the authorization code can be linked back to the PAN.

In addition, heuristic methods may be used based on location and time information to further confirm the linking of transaction data and to minimize errors.

Referring back to FIG. 7, "Storage Key" may be used to encrypt and secure data stored on local storage. Storage Keys may be stored in permanent storage using the enclave's seal key. Loss of encryption keys may result in failure. "Job Randomization Key" is a nonce issued by the Driver Node, used to obfuscate job breakdown among worker nodes. "Communication Keys" are maintained with every other network node. Nodes are identified by their public keys, certified by the Trust Manager 127.

Figure 8:
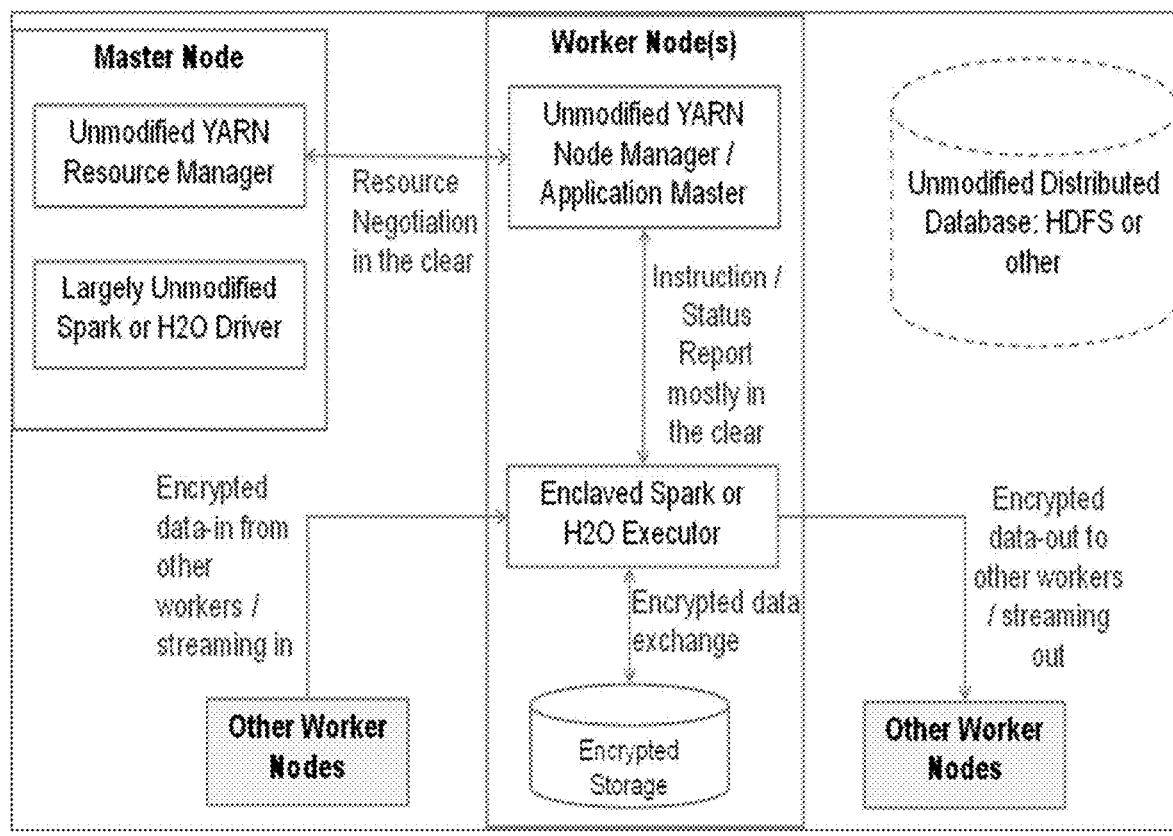
FIG. 8 is a schematic diagram of master node and worker node from the example platform according to some embodiments.

FIG. 8 outlines how a data cluster works regardless of the types of analysis applied (normalization, model training and application of the model). Platform 100 can generate insights from an enormous bank of input data. This can be achieved on one or more machines. In some embodiments, a Hadoop framework may be implemented for managing and performing big data analytics on large clusters of commodity computers. The task of cluster resource management is largely independent from the data. Worker enclaves may be embedded within a cluster managed by a resource management application such as Hadoop YARN or another component of the Hadoop stack. In some cases, the amount and size of data sets may be large (e.g., over 256 MB), which may require multiple secure enclaves 133 for distributed storage and processing.

Figure 11A:
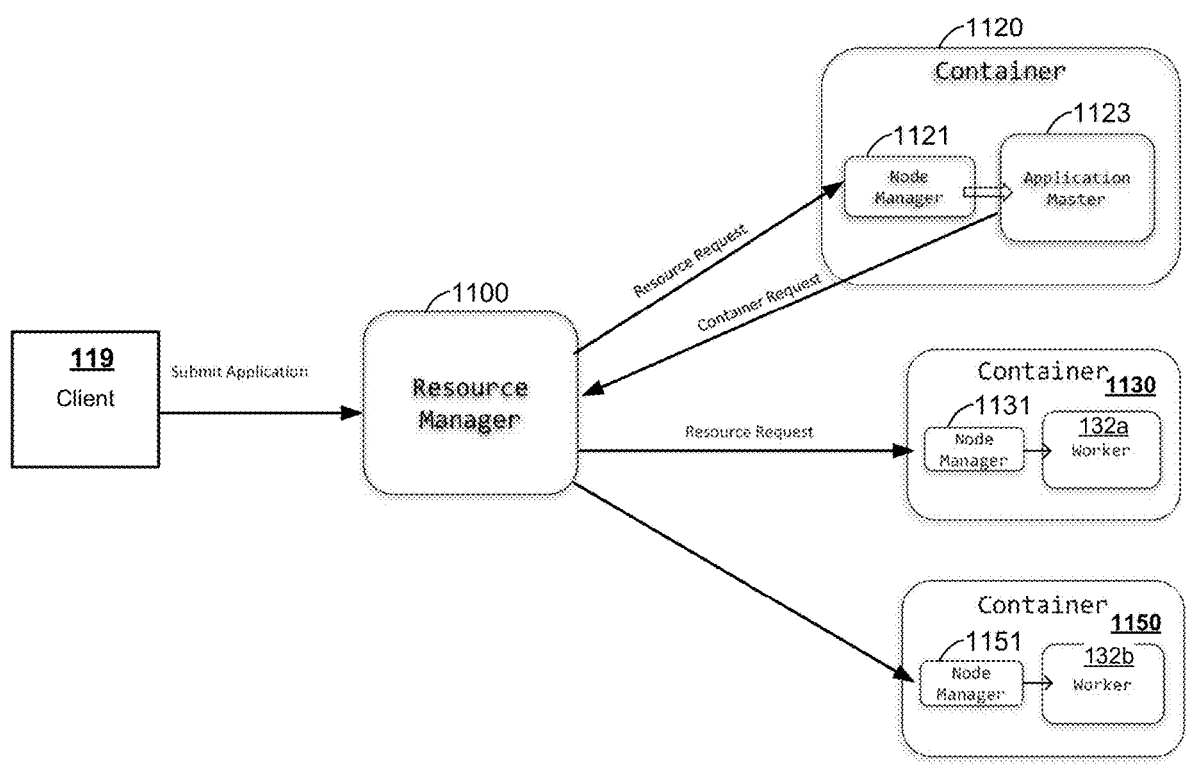
FIG. 11A shows an example resource management structure according to some embodiments.

As shown in FIG. 11A, a resource management application manages resources and tracks jobs carried out by worker nodes. The resource management application may give a user the option to control to use the nodes' architectural features, access the local file system and encrypt messages as needed. In some embodiments, the resource management application may be implemented using YARN™. The resource management application may include or be linked to various components such as: client, application master, and worker applications (which may also be referred to as worker nodes or workers).

A client, or a client system or application, may submit a request for data processing or data analytics. In some embodiments, a client system may be an external party such as partner system 115 or a component within platform 100 or Clean Room 300. A client may also commit the entire input file into a database such as HDFS.

An application master (or "master application") negotiates for resources, requests worker containers spawned and tracks their job progress. The application master requests a resource manager (see e.g. FIG. 11A) to spawn worker containers to perform a chunk of the analytics. It also sends the entire input file and directions as to what portion of the file to process. After being notified of all workers having finished, it combines their partial results.

A worker application performs data analytics. There may be multiple instances of worker applications. Each worker maybe within a secure enclave, or contains a secure enclave, and the enclave may receive the input file and the interval it should process. The analytics are carried out inside secure enclaves, and the result is written back into HDFS for the application master to aggregate.

Any representation of data outside secure enclaves may be encrypted. This includes any partition of the input or intermediate data that is shuffled among worker nodes. The nodes also check each other's authenticity before sharing critical data.

Referring back to FIG. 8, In some embodiments, a cluster management subsystem may be implemented for the secure enclaves to distribute the workload for analysis of various datasets. The cluster management subsystem may include a master application (or master node) and one or more worker applications (or worker nodes). A cluster application system may include a YARN resource manager application which manages and distributes jobs to a plurality of worker nodes in a plurality of enclaves, which can decrypt and process data. A worker application can also include a Spark or H2O executor Unmodified distributed data may be stored in a database such as HDFS (Hadoop Distributed File System).

In some embodiments, each worker node may take the minimum of the partition of the dataset and submits that local minimum to the application master once it is done. The application master then computes the global minimum as the minimum of all local minima. This process may indicate what components of the distributed application need to view the data in the clear. It is evident that no component of resource management subsystem itself does. Among the components we provide to the resource management subsystem, the workers and the application master may view the data, which may be implemented within secure enclaves.

Secure Enclaves, such as SGX Enclaves, are packaged as Runtime Libraries (DLL in Windows and so in UNIX systems). They are meant to be hosted by another native application. This application in turn, can either be a shared library itself, connecting back to the main application through a JNI2 bridge, or be a child process spawned by the Java application.

A database management system may be implemented to simplify and streamline storing of large files over a cluster. It handles replication (for failure resiliency), load balancing and other application-independent tasks.

Figure 11B:
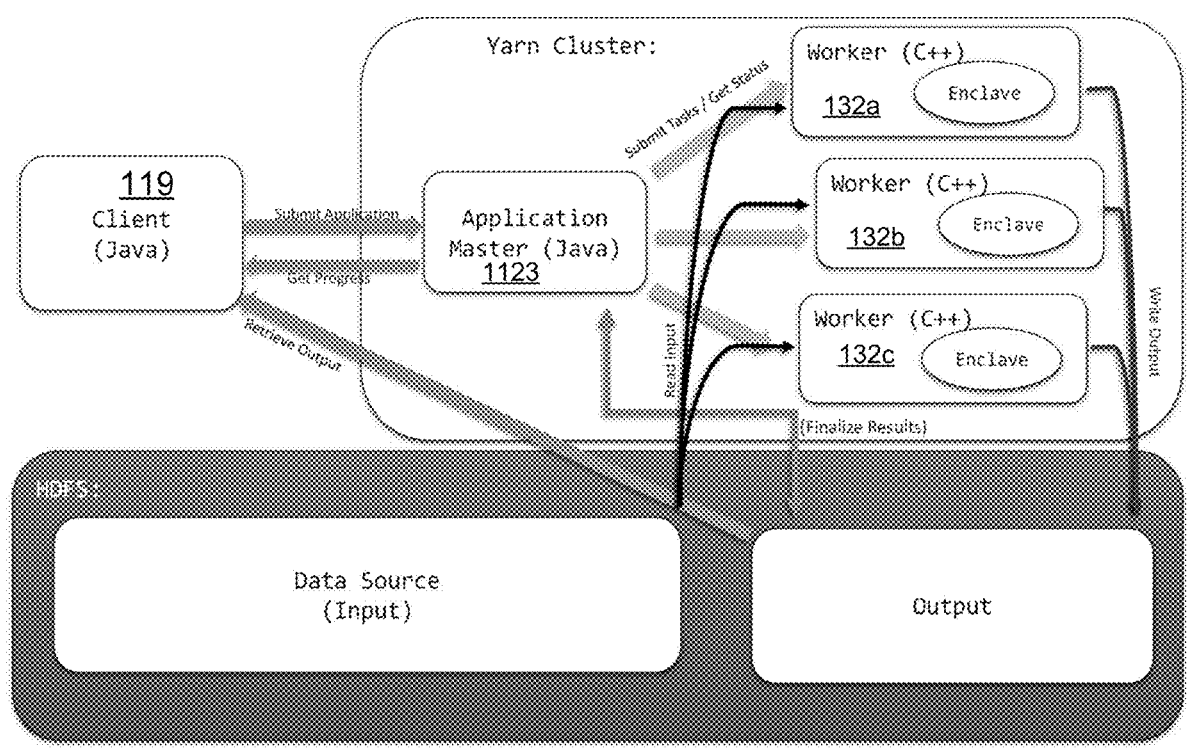
FIG. 11B shows an example schematic diagram for resource management data process according to some embodiments.

A single worker application (also referred to as a "worker node" in FIG. 8) in a secure enclave 133 may be integrated with a resource management subsystem or application such as YARN. The worker application may decrypt and analyze data stored in secure data warehouse 108. In some embodiments, the resource management application (e.g., YARN) may be implemented to manage a plurality of CPUs. A cluster management application may manage multiple worker applications across multiple secure enclaves. A cluster management application may also handle job scheduling, as shown in FIGS. 11A and 11B.

In some embodiments, between secure enclaves 133, there may be one or more authentication steps for additional security.

In some embodiments, worker applications within secure enclaves may be implemented using a suitable programming language, such as C++. In some embodiments, YARN and associated management functions may be implemented in a suitable programming language such as Java™. In some embodiments, analytics engine and analytics modules may be implemented in a suitable programming language such as Python or Java.

The trusted worker applications residing in an untrusted environment may need to share secret data and share job randomizations with one another, and if not properly managed, would put customer data at risk. Furthermore, for client convenience, the system should be designed with one point of entry, meaning that the client would have to verify only one component of the distributed system and whereby gain confidence in the entire solution, which may be achieved by remote attestation as described above.

FIG. 11A shows an example resource management structure. The resource management subsystem or application may be configured and implemented using YARN, including a resource manager 1100, and one or more node managers 1121, 1131, 1151. Once a job request is received by resource manager 1100, for example from client system 119 (e.g. a partner system 115 or a different component in platform 100), the resource manager 1100 may send a resource request to a node manager 1121 within a container 1120, which may generate an application master 1123. Next, application master 1123 may return the container request back to resource manager 1100 and spawns worker nodes 132a, 132b within separate containers 1130, 1150 to perform tasks.

FIG. 11B shows an example schematic diagram for resource management data process according to some embodiments. As a first step, client system 119 may submit a job to the Yarn Cluster, creating a container for the Application Master 1123. Next, the Application Master 1123 spawns several worker nodes or containers 132a, 132b, 132c, each with an enclave. The containers 132a, 132b, 132c then read the encoded data from the database (e.g., HDFS) and send the data to the enclave. Within the enclave, the data is decoded, processed, re-encoded, and then returned to the external container. The encoded result is written back to HDFS where the client system 119 can retrieve it. Each worker node may perform a specific task. Some or all of them may perform different or the same jobs. In some embodiments, the client is required to submit the entire input file at the beginning of each job. The data set may outlive any particular job and may already rest on the cluster.

In some embodiments, the worker nodes can be aware of which partitions of the input file they have locally stored and report that to the application master. The application master can then make an informed decision as to the assignment of partition processing to workers.

In some embodiments, encrypted channel between containers may be implemented to facilitate complicated jobs. The HDFS can be setup to mirror data in ways in order to improve efficiency while allowing the system to recover from failures. Enclaves may, in some cases, temporarily save their respective progress and resume in case they need to be shutdown.

Passing ephemeral messages through HDFS may be highly inefficient. In some embodiments, nodes may establish network connections between one another.

The dataset may be encrypted in storage. In some embodiments, all worker nodes may share a single encryption key. In other embodiments, each node may have its own encryption key. The former has the advantage of simplicity, since a holistic view of the file is possible. The latter provides better security guarantees, since an attacker's success in compromising one node will node expose the entire dataset.

If partial results are to be aggregated in the application master, the results may be stored in a secure enclave. In some embodiments, all data analytics may be delegated to worker nodes and only job metadata may be exposed to the application master.

In some embodiments, Clean Room 300 in platform 100 may process large batches of data, across many machines in a cluster. An example distributed processing database setup may be implemented using Hadoop. In addition, HDFS (Hadoop Distributed File System) provides an easy way to distribute data among nodes. SPARK (a distributed data science framework) may also be implemented together with Hadoop. For example, an application master application and one or more worker application(s) may each include machine learning/data analytics components such as Spark or H2O driver or executor. A driver application may start an executor application for various processes such as Key-Value store and memory manager inside executors.

Figure 16:
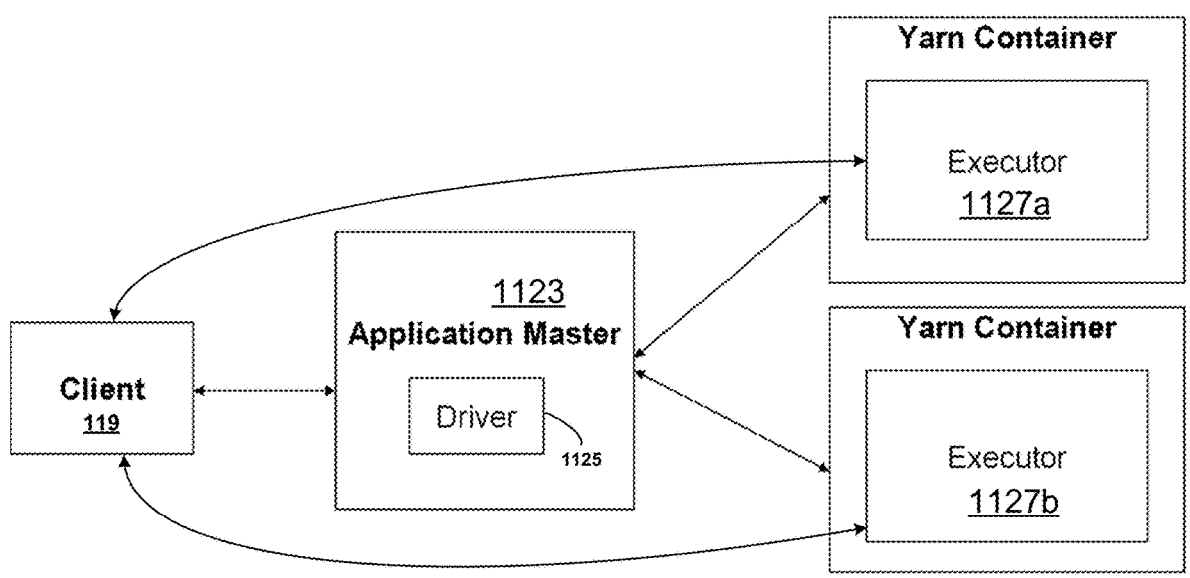
FIG. 16 illustrates an example Spark framework implementing data analytics, using YARN as a resource manager.

Referring now to FIG. 16, which shows an example Spark framework implementing data analytics, using YARN as a resource manager. Apache Spark™ is an open-source distributed general-purpose cluster-computing framework, which may include an analytics engine for large-scale data processing. In this example embodiment, client system 119 may have a Spark client installed. Application Master 1123 may have a driver application 1125 installed to coordinate resource application. A driver application 1125 may be a process running the main( ) function of the application and creating a SparkContext object to coordinate resources to perform various data analytic tasks.

A YARN container, which may act as a worker application or worker daeman, may coordinate resource allocation on one machine. Each YARN container may include an executor 1127a, 1127b, which can execute Spark tasks or applications. Generally speaking, an executor may be an implemented process launched for an application on a worker node or a YARN container, that runs tasks and keeps data in memory or disk storage across them. Each application may have its own executors.

In some embodiments, the driver application 1125 may run on the Application Master 1123 on a separate thread.

In some embodiments, Spark applications may run as independent sets of processes on a cluster, coordinated by a SparkContext object in the driver application 1125. For example, to run on a cluster, the SparkContext object can connect to several types of cluster managers including YARN, which can allocate resources across applications. Once connected, Spark acquires executors on nodes in the cluster, which are processes that run computations and store data for Clean Room 300.

Next, it may send application code (defined by JAR or Python files passed to SparkContext object) to the executors. Finally, SparkContext object may send tasks to the executors 1127a, 1127b to run.

In some embodiments, Linux Kernel Library (LKL) and MUSL library may be used to implement the driver and executor applications under Spark framework. Program codes written using LKL can run most applications linked with MUSL, including most packages written for Alpine Linux (as it uses MUSL instead of libc) SGX LKL. Though only a gcc cross compilation script is provided, g++ applications can also be compiled, either by modifying the C script to add the C++ includes from the Alpine g++ package, or simply compiling on Alpine Linux.

However, there exists some limitations to implementation using LKL. For example, most of the applications are single process applications only, though multi-threading is possible. There may be significant page fault overhead, as memory intensive applications be slow. In addition, as attestation process requires a chain of trust to be established, the attestation process may need a first attestation to be performed during the initial state of the LKL enclave, then using the enclave to verify the hash of the virtual disk image.

To overcome above-mentioned limitations, Clean Room 300 may have a modified Spark framework, in accordance with some embodiments. A Spark and Hadoop combination may require some modifications, such as:
  removing DataTimeUtils.scala
  removing or circumventing use of fork( ) (used several times to check for OS features, or find the groups a user is in)
  providing custom Groups backend to avoid using the default: ShellBasedUnixGroupsMapping.java These example modifications can get Spark framework working in local (single-node) standalone mode.

In some embodiments, as Clean Room 300 receives an amount of encrypted data, it may distribute the data to an application master 1127 for data analytics. Driver application 1125 may receive the encrypted data and transmit the data to one or more executors 1127a, 1127b to perform one or more data analytic tasks.

Figure 17:
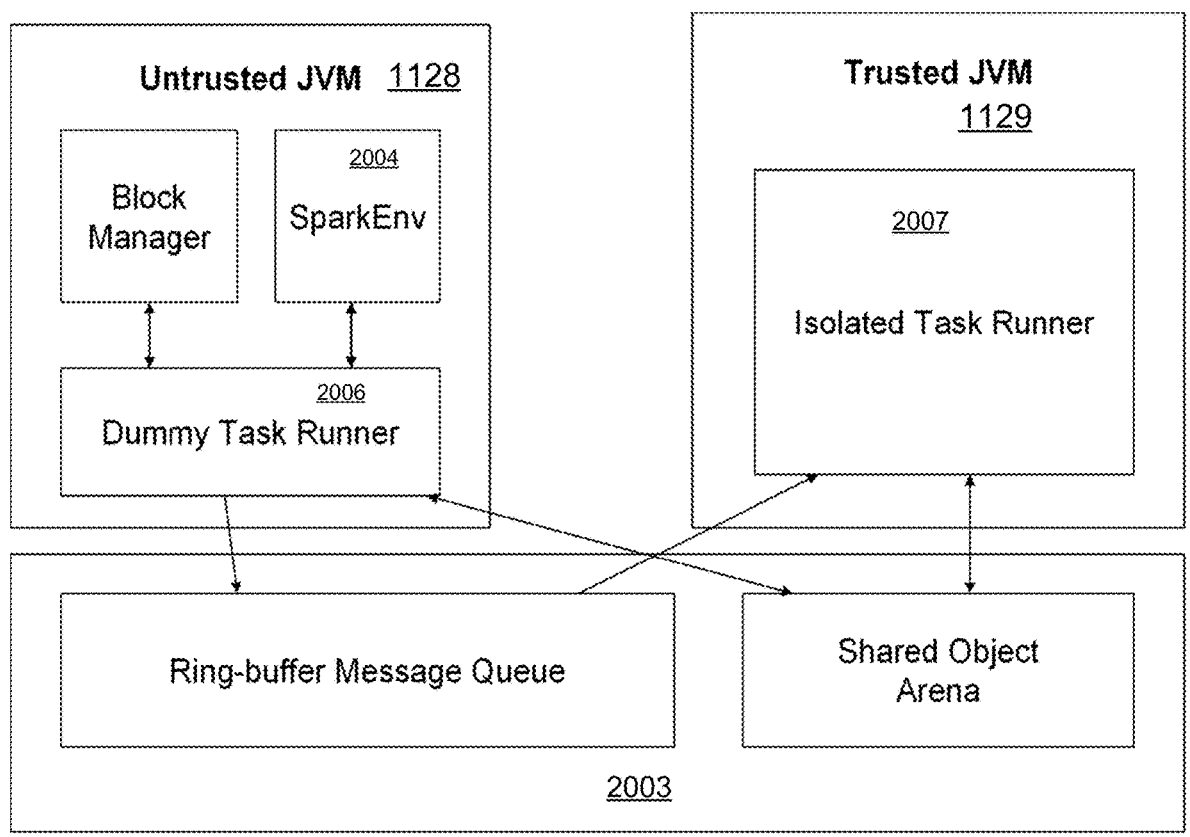
FIG. 17 shows an example executor structure under a Spark framework.

Within each executor, separate execution process may occur between sensitive data (which needs to be processed in a trusted, secure environment) and non-sensitive data (which can be computed in untrusted environment). Referring now to FIG. 17, which shows an example executor structure under a Spark framework. The executor 1127 may have three components, including: untrusted environment, such as untrusted Java virtual machine (JVM) 1128, trusted environment such as trusted JVM 1129, and a shared memory 2003.

Untrusted JVM 1128 may be configured to perform data analytics for non-sensitive data such as metadata that does not contain any customer or financial data. Untrusted JVM 1128 may have a block manager, which may be a key-value store of blocks of data (block storage). Block manager may act as a local cache in each executor, and provide the interface for uploading and fetching blocks both locally and remotely using various stores, i.e. memory, disk, and off-heap. Untrusted JVM 128 may include a SparkEnv 2004 which may be a Spark runtime environment with Spark's public services that interact with each other to establish a distributed computing platform for a Spark application. A dummy task runner 2006 within untrusted JVM can be a thread of execution of a single task, which can be created when an executor is requested to perform a task. The dummy task runner 2006 may only perform tasks on non-sensitive data that does not need to be processed within a trusted environment.

A Trusted JVM 1129 may include an isolated task runner 2007 configured to perform tasks on sensitive data, which may be decrypted prior to data processing.

A shared memory 2003 may include a ring-buffer message queue and shared object area/arena. LKL library provides a plain text shared memory file. In some embodiments, a method for communicating over shared memory, is using a ring-buffer message queue. Implementing a ring-buffer may require access to a locking structure. It is difficult to implement pthread shared mutexes, as these are backed by kernel objects, and the host and LKL container may have separate kernels. Instead, atomic operations (spinlocks) may be implemented as these are backed by hardware operations.

Below is an example code for shared memory ring-buffer in accordance with some embodiments described herein:

```
// keep checking to see if the lock is unlocked (-1),
// then try to claim it
// in a single atomic operation (compare_exchange)
void spin_lock::dock( ){
    //recursive locking
    if(locking.load( ) == THREAD_ID){
        count++;
        return;
    }
    long tst = -1;
    while(!locking.compare_exchange_weak(tst, THREAD_ID))
        tst = -1;
    count = 1;
}
// doesn't have to take a single atomic operation as
the calling thread
// should own the lock before the function changes
the locks value
bool spin_lock::unlock( ){
    if(locking.load( ) == THREAD_ID){
        count--;
        if(!count)
            locking.store(-1);
        return true;
    }
    return false;
}
```

In some embodiments, memory mapped files and atomic operations are more efficiently implemented in C++ (rather than Java or Scala). For example, a JNI bridge and wrapper class may be implemented to call the native code from Java. In other embodiments, JNA can be used but it calls fork( ). Below is an example block of program code for ring-buffer implementation:

```
void ringbuf::init_shm(const char* shm_file){
    //open the shared mem file
    shm_fd = shm_open(shm_file, O_CREAT | O_RDWR, 0777);
    header_size = compute_header_size( );
    // ... ensure file size ...
    header = (ringbuf_header*)mmap(nullptr, header_size, PROT_READ | PROT_WRITE, MAP_SHARED, shm_fd, 0);
    //the ring buffer has not been initialized so we have to do it ourselves
    if(header->magic != MAGIC){
        header->magic = MAGIC;
        header->size = msg_size * capac;
        header->msg_size = msg_size;
        header->base = header_size;
        header->beg = 0;
        header->end = 0;
        init_locks( );
    }
    //copy the info on capac from the ring buffer as it has already been initialized
    else{
        //... message size error handling ...
        capac = header->size / header->msg_size;
    }
    ftruncate(shm_fd, header_size + msg_size * capac);
    buffer = mmap(nullptr, header->size, PROT_READ | PROT_WRITE, MAP_SHARED, shm_fd, header->base);
}
```

Figure 18:
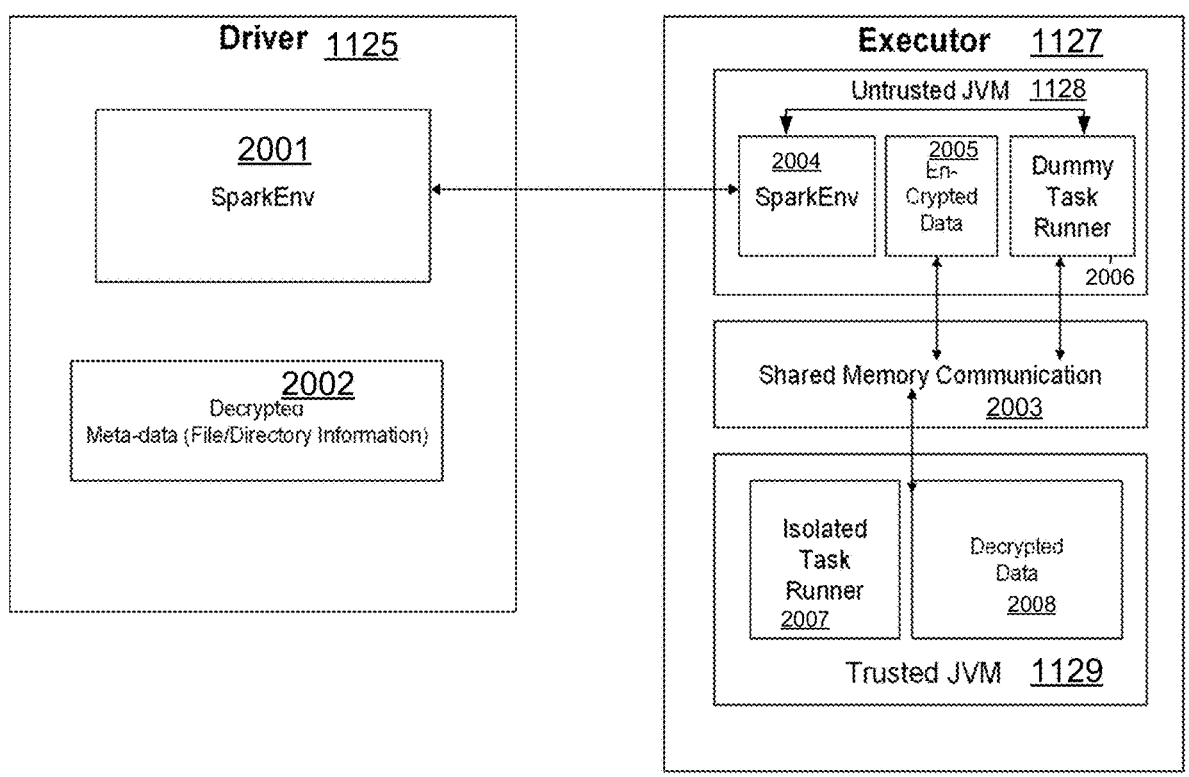
FIG. 18 shows an example executor structure in co-operation with a driver application under a Spark framework.

FIG. 18 shows an example executor structure 1127 in co-operation with a driver application 1125 under a Spark framework, in accordance with some embodiments. Driver 1125 may include a Spark runtime environment SparkEnv 2001 as well as a data storage area 2002 for decrypted data, which may include non-sensitive information such as metadata (e.g. file-directory information).

Below is an example test driver application 1125 in accordance with some embodiments described herein:

```
SparkSession spark = SparkSession.builder( ).config(conf).getOrCreate( );
System.out.println("Spark Version: " + spark.version( ));
System.out.println("Spark Initialization complete.\n\n");
long start = System.nanoTime( );
//read a csv file
DataFrameReader reader = spark.read( );
Dataset<Row> df = reader.option("header", "true").csv("file:///app/test.csv");
df.show( );
//aggregated sum over A
df.select(new Column("A"),
        new Column("B")
            .cast(DataTypes.IntegerType))
    .groupBy(new Column("A"))
    .sum("B").show( );
//A * 2 + B
Column selection = new Column("A").muitiply(2)
            .plus(new Column("B"));
Dataset<Row> df2 = df.select(selection);
df2.show( );
long stop = System.nanoTime( );
System.out.println("Elapsed time: " + (stop - start) + "ns");
```

Executor 1127 includes an untrusted JVM 1128, a shared memory communication 2003 and a trusted JVM 1129. Untrusted JVM 1128 includes SparkEnv 2004, a data storage area 2005 for encrypted data, and a dummy task runner 2006. The encrypted data may be sent from driver 1125 in encrypted form, and get sent to trusted JVM 1129 in encrypted form through shared memory communication 2003. Once encrypted data arrives at trusted JVM 1129, it may be decrypted and stored in a data storage 2008 for decrypted data, and subsequently may be processed by isolated task runner 2007 within trusted JVM 1129.

Figure 19:
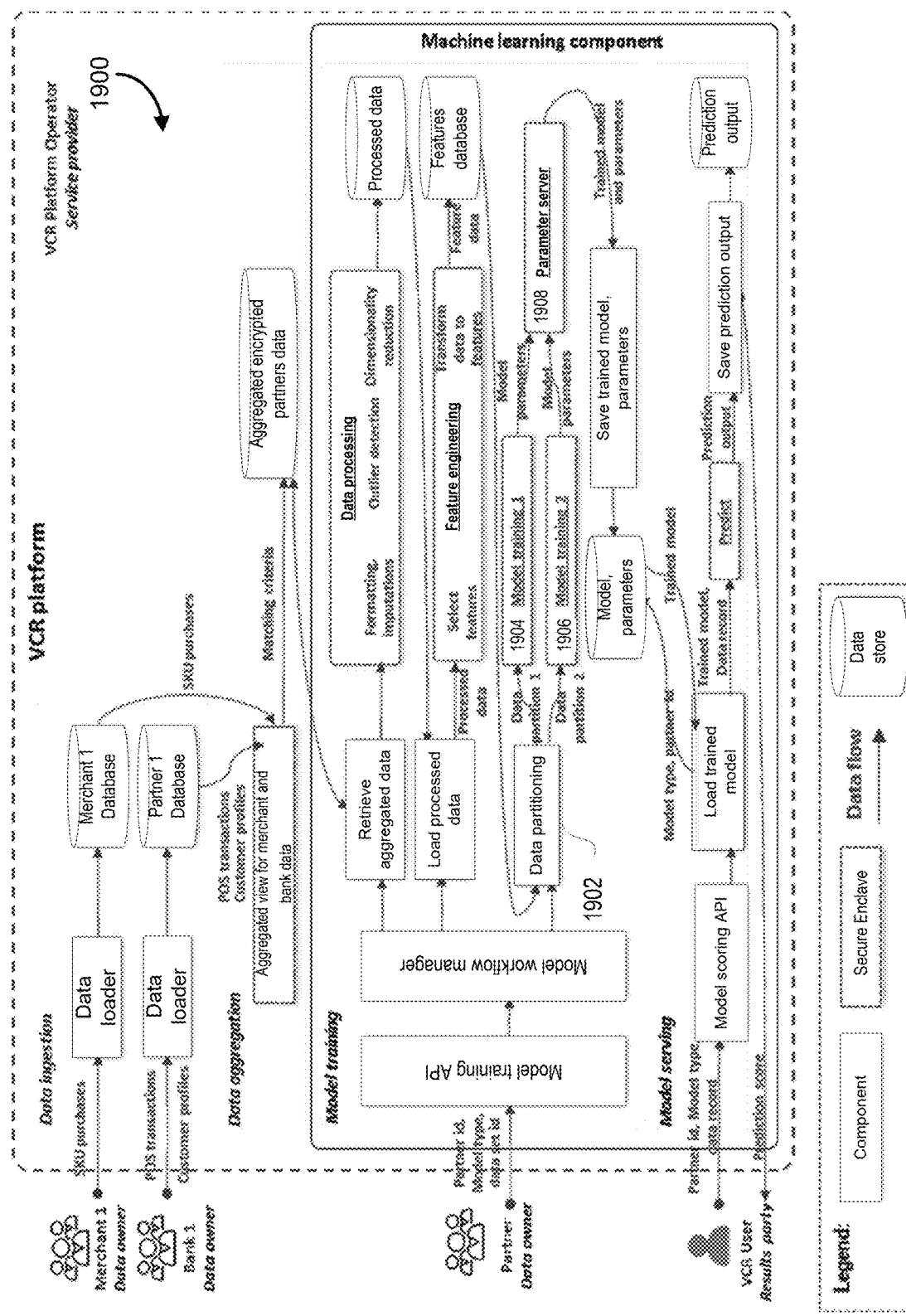
FIG. 19 is an example block schematic of a machine learning architecture and data flow, according to some embodiments.

FIG. 19 is an example block schematic of a machine learning architecture 1900 and data flow, according to some embodiments. A virtual clean room platform is shown that is directed to a mechanism for secure processing. Data is received from various sources including merchants, banks, among others.

As provided in FIG. 19, a machine learning API is provided that allows a merchant/data owner to initiate a training flow, by selecting a model type (e.g. recommender, clustering) and data set id.

A merchant partner computing device will have black-box access to the model, and model training can be performed in batch mode training phases. In a variation, other training phases can include near-real time, online training AutoML and interactive model design. Models can include various approaches suitable for different use cases (e.g., K-means. matrix factorization, random forest etc.). The system includes security settings that establish clear delineation of access control permissions (e.g. read, create, update, delete), roles for each platform partner and within their one departments (e.g., Marketing and SAI have different data access control rights), for each data element has been already defined).

Each of the sources could be a custodian of specific customer data. However each of the sources may not wish to have their customer data available to the other partner, for example, due to various privacy directives, and best practices. Secure processing is directed to protect the overall computational steps such that parties without having proper access privileges are unable to access one or more portions of the underlying data that is being used in the machine learning data architectures.

The data set is assumed to have been already ingested in the platform, harmonized to a common schema and aggregated with the bank data owner (e.g., machine learning role) data sets. The Merchant data owner should not have granular access to the selected model by tuning its parameters, weights etc. The merchant can only specify the model type, whereas the service provider will be able to further tune the model.

Data is provided in an encrypted form and loaded for data processing and the system. A model architecture workflow manager orchestrates a machine model for training activities as well as workflow progression. The model architecture workflow manager is configured to query the aggregated data store for the specific data sets, pertinent to the selected model, merchant and bank partners. The privacy sensitive data elements or data sets will be encrypted to ensure partners' data privacy.

In an embodiment, secure enclaves (e.g., isolated data processors, either hardware or software, or combinations thereof) are utilized for conducting machine learning subtasks. The secure enclaves, in some embodiments, may store encryption keys that are used for securely accessing underlying data. The system includes a series of secure enclave processors, shown in the dotted lines, which are adapted to operate in concert to generate data structures representing data science insights.

For example, the data processing can be hosted within an SGX enclave, where the aggregated data sets will be loaded for further processing, before being fed to the training flow. In the enclave, the data is decrypted, then apply required formatting, transformations, impute missing values, identify and remove outliers etc. When the processing is completed, then the data will be encrypted to be sent to another component which will save the processed data in a database.

Secure enclave processing leads to limitations in respect of computing resource constraints, which may lead to reduced performance and speed. Relative to non-secure processing paradigms, increased complexity results due to encryption and access restriction requirements.

Accordingly, as described in various embodiments herein, an approach is proposed that is directed to machine learning data architectures with strong privacy and robust security. The machine learning architecture, in some embodiments, includes multiple interconnected secure enclave processing partitions (e.g., separate secure enclave processors), which process and maintain separate training model architecture.

In some embodiments, if the data size exceeds 90 MB, for example, then it will need to be partitioned, sent iteratively and processed by multiple SGX enclaves. In particular, due to constraints with available data processing performance by secure enclave processors, a data partitioning unit 1902 is adapted to partition data such that individual data processing partitions 1904, and 1906, each, in parallel, process the data using individually stored model data architectures. In some embodiments, individual data processing partitions 1904, 1906, are separate secure processing enclaves.

The data partitioning unit 1902 is a partition controller engine that can be implemented as electronic circuits that are configured to provision one or more secure enclave sub processors and to transmit to each of the one or more secure enclave sub processors a partition of the encrypted data.

Sensitive data elements remain encrypted as they are loaded. In the enclave, the processed data is decrypted, then aggregation, computations will be applied to extract new features. When the feature extraction is complete, then the features data set will be encrypted. When each training phase is complete, the model output, parameters, weights, metrics will be encrypted.

As the data is processed through each of the partitions, a separate model architecture is updated to generate updated model architecture parameter data structures. The one or more secure enclave sub processors of individual data processing partitions 1904, 1906 are configured to process the corresponding partition of the encrypted data using a local copy of a machine learning architecture to generate one or more parameter update data structures.

The updated model architecture parameter data structures from each of the partitions is aggregated at a parameter aggregation unit 1908 (e.g., parameter server, which can be its own enclave).

The parameter aggregation unit 1908 is configured to save an update an aggregated trained model architecture which is then re-propagated to the secure processing traditions. It can be deployed within an SGX enclave, and it will receive all the updates for the model parameters, weights etc. The model can be encrypted when it leaves the enclave.

In some embodiments, at least two secure enclave sub processors, 1904, and 1906 are configured to transmit one or more parameter update data structures directly between one another to update the corresponding local copy of the machine learning architecture.

This architecture of some embodiments aids in overcoming technical constraints related to reduced throughput of secure enclave partitions. For example, some secure enclave partitions are limited to model architecture sizes of approximately 90 MB or smaller. Accordingly, a number of coordinated partitions operate in concert to provide the overall secure processing.

The trained model, its parameters, weights etc. is persisted to be further used by the prediction/scoring mechanisms.

In another embodiment, the enclave partitions are also configured to have interconnections with one another during parallel operations such that the enclave partitions are able to share determine parameters amongst each other as opposed to receiving updated parameters in trained models from the aggregator processor, for example, made available through an output API for partners, which can query the previously trained model for prediction results. It will receive as input the partner id, model type and data record to apply the machine learning prediction. The API can output the prediction result back to the user.

Applications for machine learning and secure she learning as described in some embodiments include, for example, generation of data structures by the machine learning model architectures that include subsets of customer identifiers for identifying clusters based on similarities with a training set of identifiers.

For example, a training set of identifiers can include high revenue loyal customers, and the trained model architecture, can be utilized to identify target customers that are not within the training set but may be overlooked as potential targets. In this example, secure processing using a secured machine learning data architecture is used to ensure that there is no unauthorized access of the underlying data, which could include sensitive customer data, is made by unauthorized users. The secure enclave processors are used to ensure, for example, that merchants would not have a full view of customer profiles, especially where such merchants are not the custodians of the customer profiles.

Predictions, for example, utilize the trained model which is deployed as an SGX enclave that performs the actual computation for predicting the scoring results. The trained model architecture and the input data record are provided to a predictor engine, which outputs one or more data structures encapsulating the prediction score, confidence metrics etc. The prediction results (model id, model type, partner id, prediction score, input record) can be recorded in a database for further performance monitoring.

Figure 20:
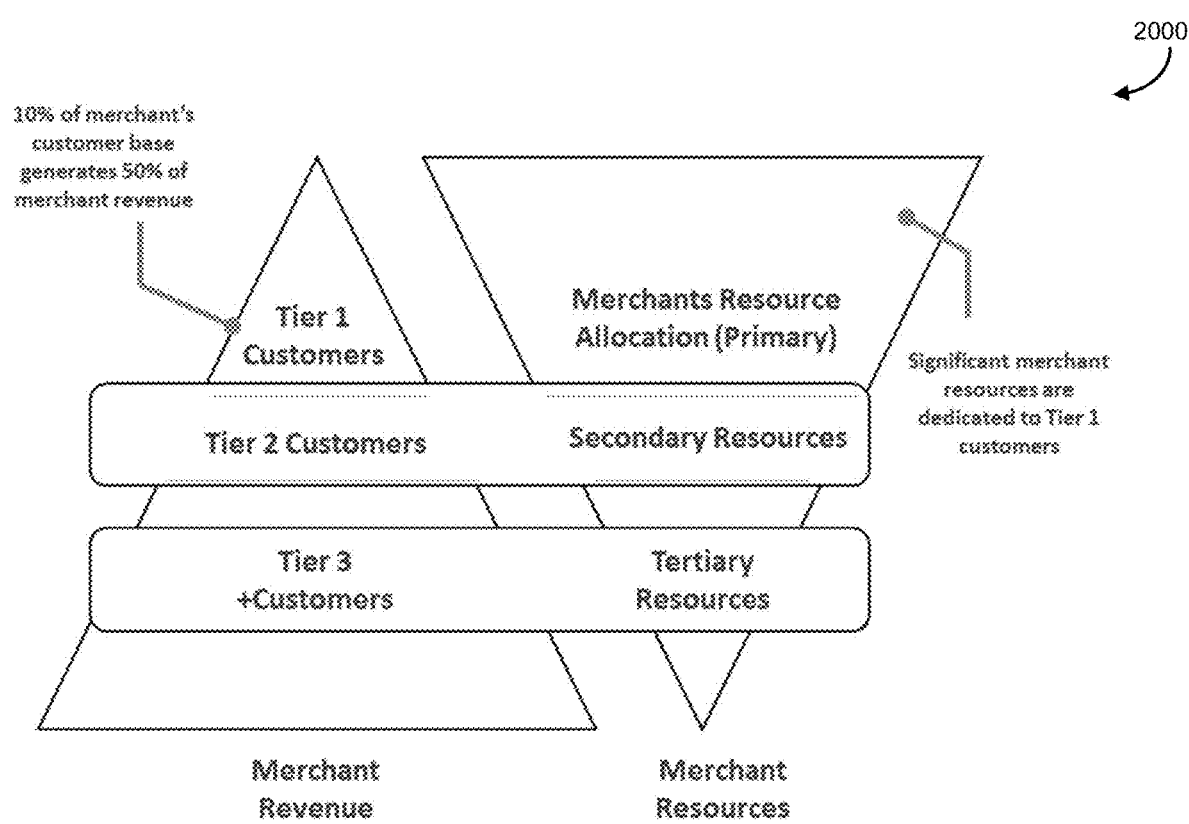
FIG. 20 is an example illustration showing resource allocation to different tiers of customers.

FIG. 20 is an example illustration showing resource allocation to different tiers of customers. In this example, it is observed that merchants focus their primary resources to understand and service Tier 1 customers.

The merchants can leverage external firms to augment resources to target Tier 2 and Tier 3 customer base. There is an opportunity for another institution, such as a financial institution (FI) to provide a machine learning mechanism to (i) analyze their Tier 1 customers (loyalty and non-loyalty members) and (ii) apply insights to drive customers from Tier 2 to Tier 1. The FI's horizontal data can be utilized to better assess and apply insights to drive conversion for merchant partner, resulting in increase in loyalty and revenue. Similarly, the machine learning model can be used to convert Tier 3+ customers.

Figure 21:
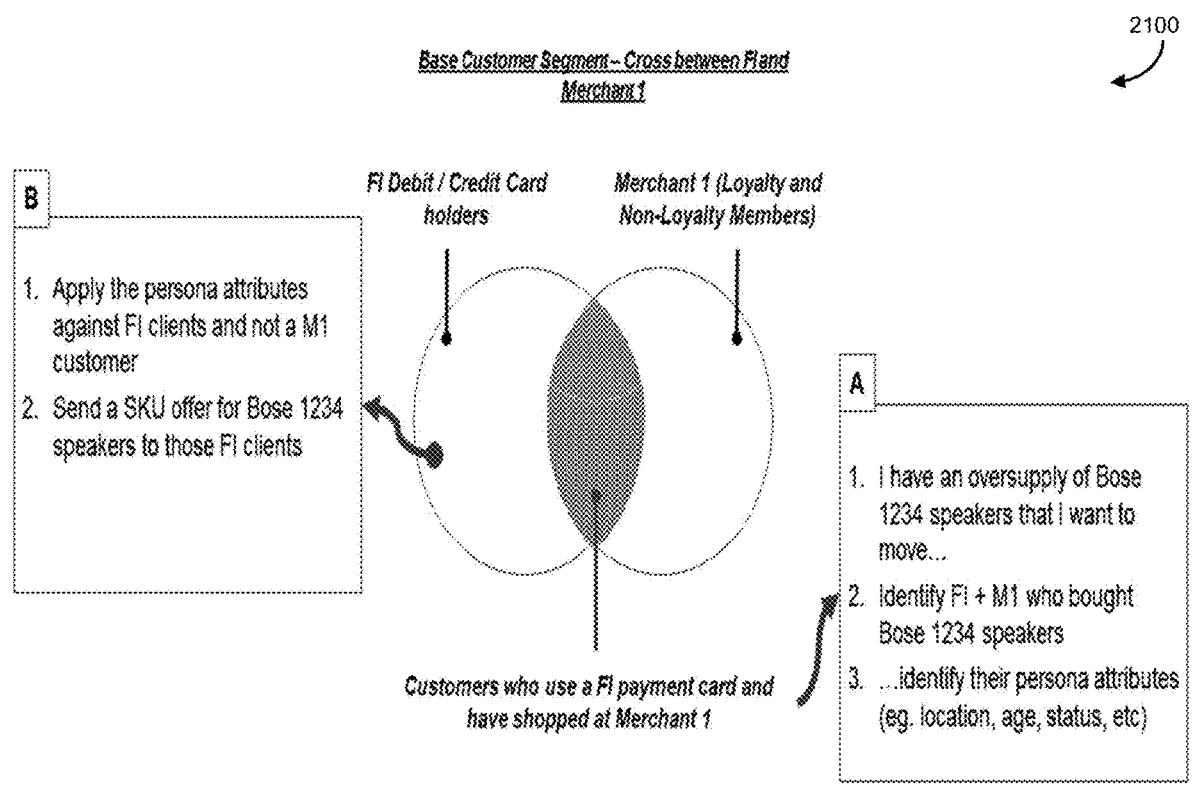
FIG. 21 is an example Venn diagram showing areas of cross-over and targeting opportunity as between the customers of the two different data sets, according to some embodiments.

FIG. 21 is an example Venn diagram 2100 showing areas of cross-over and targeting opportunity as between the customers of the two different data sets, according to some embodiments. As a merchant, an objective may be a desire to engage with new customers that don't shop at stores with SKU offers.

The overlap areas include customers which are used for training the machine learning model architecture. Accordingly, persona attributes are extractable by training the machine learning models. For example, a merchant may have an oversupply of Bose 1234 speakers that the merchant wants to move. The system trains models using identities of FI+M1 customers who bought Bose 1234 speakers, the model identifying their persona attributes (e.g., location, age, status).

Once machine learning models are trained, they can be applied against new personas from either merchant one or the financial institution's customer sets to identify potential customers to target. In this example, there may be an offer for speaker purchases that can be transmitted to the newly identified customers. In this case, the machine learning model architectures would provide data structures encapsulating identifiers of the targets of the customers, which may be used to generate machine instructions for automatic offer generation and distribution. The persona attributes are applied against FI clients and not a M1 customer, and the system may control the sending of a SKU offer for Bose 1234 speakers to those FI clients.

Figure 22:
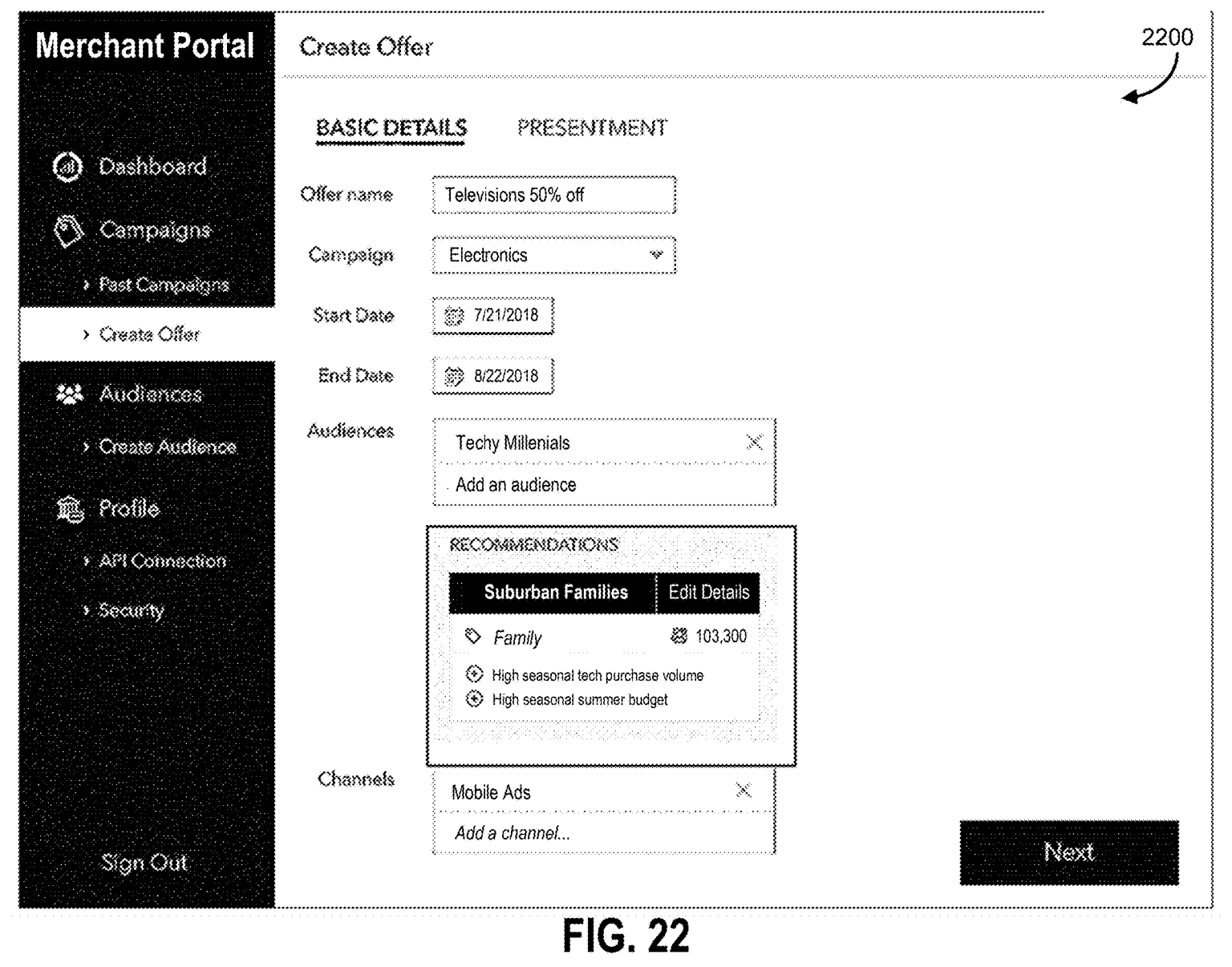
Figure 23:
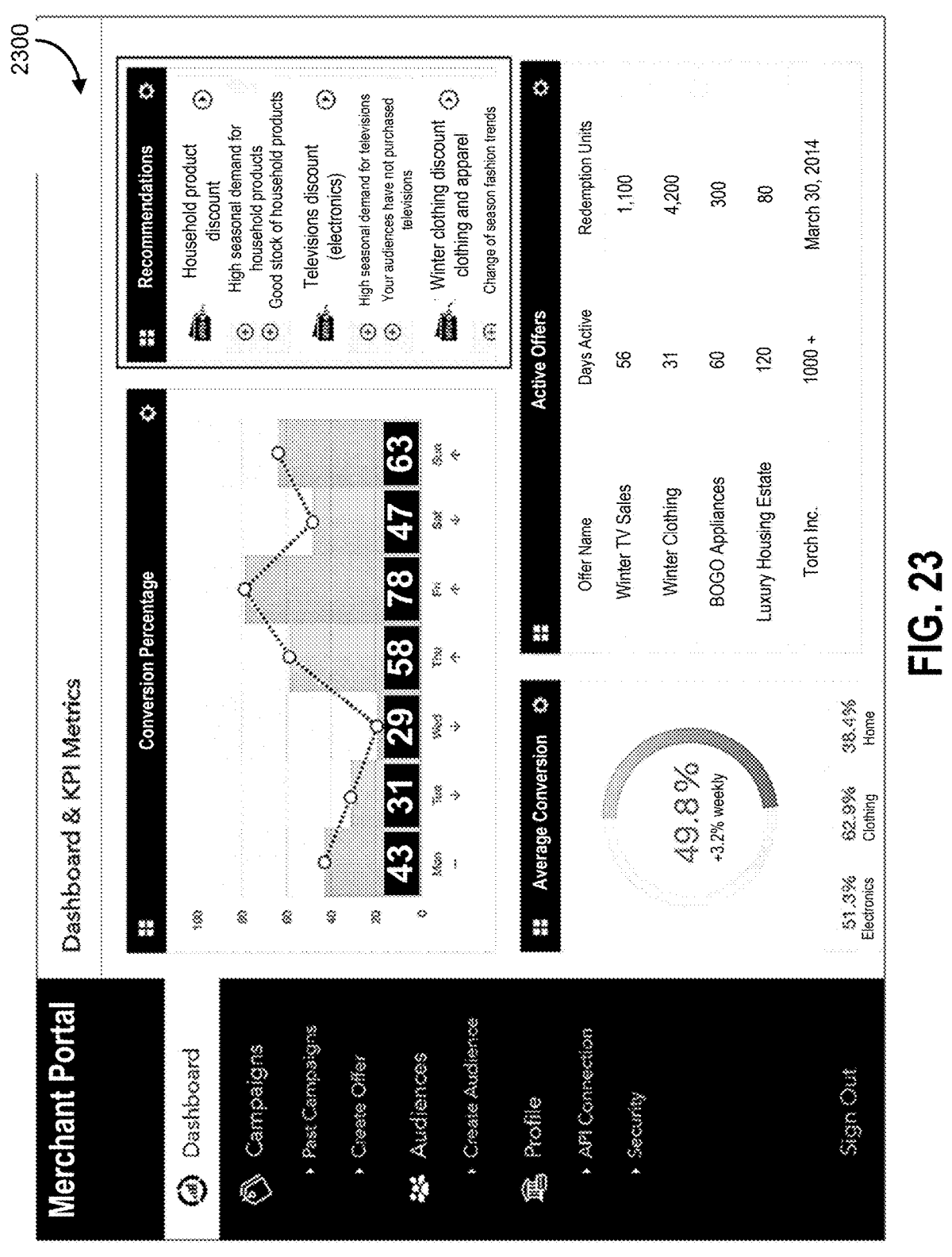

FIG. 22 and FIG. 23 show examples of generated recommendations.

FIG. 22 is an example rendering 2200 of a graphical user interface adapted to show a graphical widget showing a generated recommendation, according to some embodiments. In this rendering, an offer generation merchant portal dashboard is provided which includes a recommendation widget that generates a target set of personas, in this case, also showing attributes which may lead to the rationale for the recommendation. This approach can be used to improve selection criteria applied to an audience builder, and may provide automation of a process for setting up audiences based on recommended audiences based on information provided in the offer campaign of FIG. 21.

FIG. 23 is an example rendering 2300 of a graphical user interface adapted to show a graphical widget bar showing generated recommendations, according to some embodiments. In this widget bar, multiple recommendations are shown, which indicate customers who may be targeted and rationales for why these customers would be targeted based off of the machine learning outputs of the machine learning data architecture.

The system assesses the data in VCR core and (i) identity attractive audiences and (ii) suggest offer campaigns that merchants should consider. Example: VCR uncovers there are 250K customers, who have a high likelihood to purchase an electric car because of increase in wealth, positive sensitivity towards the environment and travel long distances. Recommend to CarCo, a partner of VCR to publish a $1000 offer to this audience segment.

Figure 24:
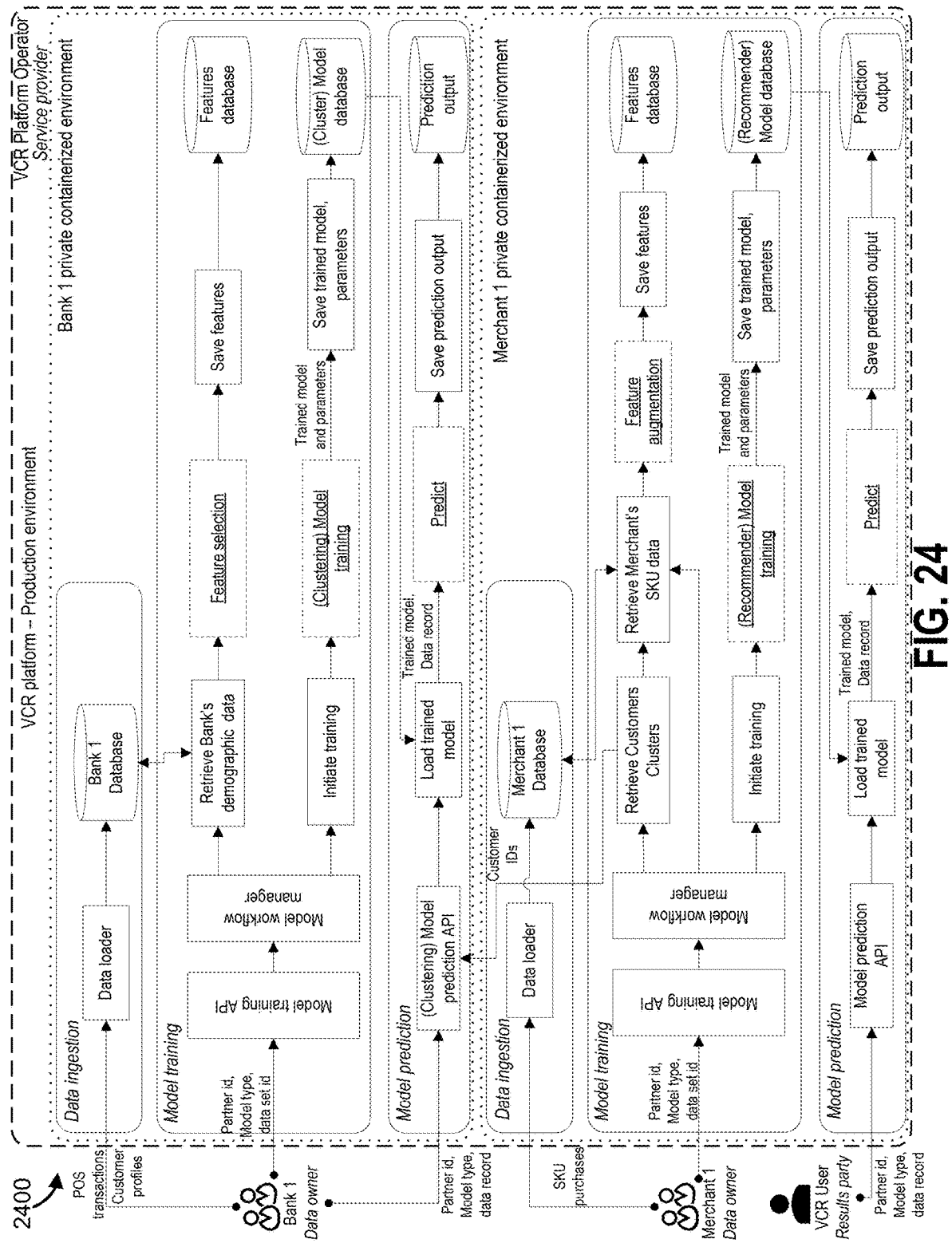
FIG. 24 is an illustration of an example production environment and data flow according to some embodiments.

FIG. 24 is an illustration of an example production environment and data flow according to some embodiments. In this variant example, both the financial institution and the merchant each have a corresponding private containerized environment. The merchant's data may be informed by SKU data, allowing the merchant to connect purchases with actual products or services being sold at a SKU level.

Figure 12:
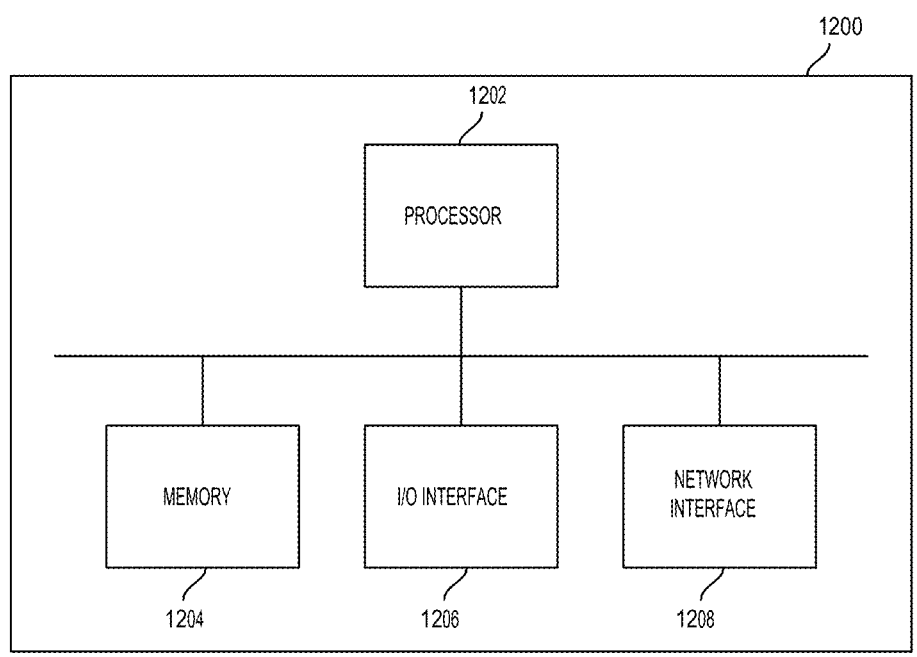
FIG. 12 is a schematic diagram of a computing device used to implement the example platform according to some embodiments.

FIG. 12 is a schematic diagram of a computing device 1200 such as a server. As depicted, the computing device includes at least one processor 1202, memory 1204, at least one I/O interface 1206, and at least one network interface 1208.

Processor 1202 may be an Intel or AMD x86 or x64, PowerPC, ARM processor, or the like. Memory 1204 may include a suitable combination of computer memory that is located either internally or externally such as, for example, random-access memory (RAM), read-only memory (ROM), compact disc read-only memory (CDROM).

Each I/O interface 1206 enables computing device 1200 to interconnect with one or more input devices, such as a keyboard, mouse, camera, touch screen and a microphone, or with one or more output devices such as a display screen and a speaker.

Each network interface 1208 enables computing device 1200 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others.

Computing device 1200 is operable to register and authenticate users (using a login, unique identifier, and password for example) prior to providing access to applications, a local network, network resources, other networks and network security devices. Computing devices 1200 may serve one user or multiple users.

Figure 13:
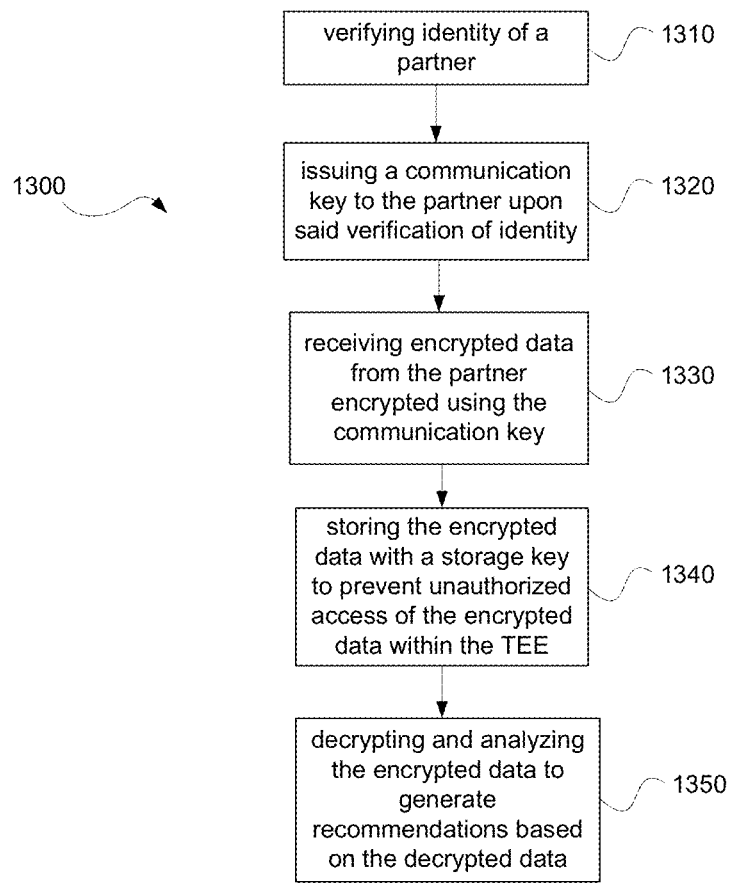
FIG. 13 illustrates an example process executed by the example platform according to some embodiments.

FIG. 13 describes an example flowchart 1300 executed by platform 100 having a TEE. At step 1310, platform 100 may verify identity of a partner system 115. At step 1320, platform 100 may, upon verification of partner's identity, issue a communication key to the partner system 115 for encrypting consumer data. At step 1330, platform 100 may receive encrypted data from the partner encrypted using the communication key. At step 1340, platform 100 may store the encrypted data with a storage key to prevent unauthorized access of the encrypted data within the TEE. At step 1350, platform 100 may decrypt and analyze the encrypted data to generate recommendations based on the decrypted data.

The embodiments of the devices, systems and processes described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references may be made regarding control and computing devices. It should be appreciated that the use of such terms may represent one or more computing devices having at least one processor configured to execute software instructions stored on a computer readable tangible, non-transitory medium. For example, the platform 100 may have a server that includes one or more computers coupled to a web server, database server, or other type of computer server in a manner to fulfill described roles, responsibilities, or functions.

The foregoing discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product instructing physical operations. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the processes provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and processes implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The platform 100 may be implemented as a computing device with at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

For example, and without limitation, the computing device may be a server, network appliance, microelectromechanical Systems (MEMS) or micro-size mechanical devices, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the processes described herein.

A processor may be, for example, a microprocessor or microcontroller, a digital signal processing (DSP) processor, an integrated circuit, a field programmable gate array (FPGA), a reconfigurable processor, a programmable read-only memory (PROM), or combinations thereof.

Data storage device may include a suitable combination of any type of computer memory that is located either internally or externally.

Computing device may include an I/O interface to enable computing device to interconnect with one or more input devices, such as a keyboard, mouse, camera, touch screen and a microphone, or with one or more output devices such as a display screen and a speaker.

Although the embodiments have been described in detail, it should be understood that various changes, substitutions and alterations can be made herein.

Moreover, the scope of the present application is not intended to be limited to the particular embodiments of the process, machine, manufacture, composition of matter, means, processes and steps described in the specification. As one of ordinary skill in the art will readily appreciate from the disclosure of the present invention, processes, machines, manufacture, compositions of matter, means, processes, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, processes, or steps.

As can be understood, the examples described above and illustrated are intended to be exemplary only.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The invention claimed is:

1. A computer implemented system for maintaining a segregated data processing subsystem, the system comprising:
   a computer readable memory having a protected memory region that is encrypted by a storage key such that the protected memory region is segregated relative to at least one of an operating system or a kernel system, the protected memory region including at least a data storage region and a data processing subsystem storage region;
   a secure processor configured to provide:
   a data receiver configured to separately receive, from each partner system of a plurality of partner systems, a data set corresponding to the partner system encrypted by a key corresponding to the partner system;
   the data receiver configured to securely store, using the storage key, the encrypted data sets received from the plurality of partner systems within the data storage region of the protected memory region;
   responsive to receiving a query data message relating to the encrypted data sets in the protected memory region, decrypt and store, the encrypted data sets within the data processing subsystem storage region of the protected memory region;
   execute the query against the decrypted data sets, and
   generate an output data structure generated based on the execution of the query against the decrypted data sets stored in the protected memory region.

2. The system of claim 1, wherein the segregated data processing subsystem maintains a segregated machine learning data model architecture comprising interconnected computing nodes that operate in concert to generate the output data structure using at least a portion of the one or more data sets in the data storage region in the protected memory region as training sets or validation sets representing data from at least two computing devices of the plurality of computing devices.

3. The system of claim 2, wherein the secure processor is configured to:
   transmit to one or more sub processors a partition of the protected memory region;
   and wherein the one or more sub processors are configured to process the corresponding partition of the protected memory region using a local copy of the machine learning data model architecture to generate one or more parameter update data structures, the one or more parameter update data structures are aggregated such that they can be used to refine at least one parameter of the machine learning data model architecture.

4. The system of claim 3, wherein there are at least two sub processors, including a first sub processor and a second sub processor that are configured to transmit one or more parameter update data structures directly between one another to update the corresponding local copy of the machine learning data model architecture.

5. The system of claim 1, wherein the data receiver is further configured to generate public/private key pairs each corresponding to a computing device of the one or more corresponding computing devices, and wherein the corresponding key is a private key corresponding to the corresponding computing device.

6. The system of claim 1, wherein the protected memory region is encrypted using the storage key that is only accessible by a trusted execution environment operating on the secure processor during execution of a query as instructed in the query data message, the storage key not accessible by computing processes corresponding to the operating system or the kernel system.

7. The system of claim 1, wherein the protected memory region is encrypted with the storage key that is only accessible to the secure processor and is inaccessible to administrator accounts of a system upon which the secure processor resides.

8. The system of claim 7, wherein the storage key uses a unique endorsement key generated during manufacturing that is not accessible outside the secure processor.

9. The system of claim 1, wherein a remote attestation process is periodically conducted by a secure processor, the remote attestation process including transmitting a remote attestation payload to the secure processor.

10. The system of claim 1, wherein a remote attestation process is periodically conducted by the secure processor, and the remote attestation process including the secure processor generating a remote attestation transcript data structure.

11. A computer implemented method for a trusted execution environment maintaining a segregated data processing subsystem, the method operating on a computer readable memory having a protected memory region that is encrypted by a storage key such that it is segregated relative to at least one of an operating system or kernel system of a computing device implementing the trusted execution environment, the protected memory region including at least a data storage region and a data processing subsystem storage region, the method comprising:
   receiving, from each partner system of a plurality of partner systems, a data set corresponding to the partner system encrypted by a key corresponding to the partner system;
   securely storing, using the storage key, the encrypted data sets received from the plurality of partner systems within the data region of the protected memory region;
   responsive to receiving a query data message relating to the encrypted data sets in the protected memory region, decrypting and storing, the encrypted data sets within the data processing subsystem storage region of the protected memory region;
   executing the query against the decrypted data sets; and
   generating, using processes running within the protected memory region, an output data structure based on the execution of the query against the decrypted data sets stored in the protected memory region.

12. The method of claim 11, wherein the segregated data processing subsystem maintains a segregated machine learning data model architecture comprising a series of interconnected computing nodes that operate in concert to generate the output data structure responsive to the query data message using at least a portion of the one or more data sets into data storage region in the protected memory region as training sets or validation sets.

13. The method of claim 12, comprising transmitting to one or more sub processors a partition of the protected memory region;
processing the corresponding partition of the protected memory region using a local copy of the machine learning data model architecture to generate one or more parameter update data structures used to refine at least one parameter of the machine learning data model architecture that are distributed to the one or more sub processors to update the corresponding local copy of the machine learning data model architecture.

14. The method of claim 11, wherein the data receiver is further configured to generate public/private key pairs each corresponding to a computing device of the one or more corresponding computing devices; and wherein the corresponding key is the private key corresponding to the corresponding computing device.

15. The method of claim 11, wherein the protected memory region is encrypted using the storage key that is only accessible by a trusted execution environment operating on the secure processor during execution of a query as instructed in the query data message, the storage key not accessible by computing processes corresponding to the operating system or the kernel system.

16. The method of claim 11, wherein the protected memory region is encrypted with the storage key that is only accessible to the secure processor and is inaccessible to the administrator accounts of a system upon which the secure processor resides.

17. The method of claim 16, wherein the storage key uses a unique endorsement key generated during manufacturing that is not accessible outside the secure processor.

18. The method of claim 11, comprising periodically conducting a remote attestation, the remote attestation process including transmitting a remote attestation payload to the secure processor.

19. The method of claim 11, comprising periodically conducting a remote attestation process, the remote attestation process including generating, by the secure processor, a remote attestation transcript data structure.

20. A non-transitory computer readable medium, storing machine interpretable instructions which when executed by a processor, cause the processor to perform a computer implemented method for a trusted execution environment maintaining a segregated data processing subsystem, the method operating on a computer readable memory having a protected memory region that is encrypted by a storage key such that it is segregated relative to at least one of an operating system or a kernel system of a computing device implementing the trusted execution environment, the protected memory region including at least a data storage region and a data processing subsystem storage region, the method comprising:
receiving, from each partner system of a plurality of partner systems, a data set corresponding to the partner system encrypted using a key corresponding to the partner system;
securely storing, using the storage key, the encrypted data sets received from the plurality of partner systems within the data region of the protected memory region;
responsive to receiving a query data message relating to the encrypted data sets in the protected memory region, decrypting and storing, the encrypted data sets within the data processing subsystem storage region of the protected memory region;
executing the query against the decrypted data sets; and
generating, using processes running within the protected memory region, an output data structure based on the execution of the query against the decrypted data sets stored in the protected memory region.

\* \* \* \* \*